United States Patent
Washisu

(10) Patent No.: US 7,756,354 B2
(45) Date of Patent: Jul. 13, 2010

(54) IMAGE PROCESSING APPARATUS, IMAGE TAKING APPARATUS AND PROGRAM

(75) Inventor: Koichi Washisu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 994 days.

(21) Appl. No.: 10/852,334

(22) Filed: May 24, 2004

(65) Prior Publication Data

US 2004/0239779 A1 Dec. 2, 2004

(30) Foreign Application Priority Data

May 29, 2003 (JP) .............................. 2003-153475

(51) Int. Cl.
 G06K 9/40 (2006.01)
 H04N 5/235 (2006.01)
 H04N 9/64 (2006.01)
 H04N 5/202 (2006.01)
 H04N 1/40 (2006.01)
(52) U.S. Cl. .................... 382/274; 348/221.1; 348/251; 348/254; 358/461
(58) Field of Classification Search ................. 382/274; 348/221.1, 251, 254; 358/461
 See application file for complete search history.

(56) References Cited

U.S. PATENT DOCUMENTS 5,949,551 A * 9/1999 Miller et al. ................. 358/408
6,549,681 B1 * 4/2003 Takiguchi et al. ............ 382/294
2002/0135688 A1 * 9/2002 Niikawa ...................... 348/251
2002/0186881 A1 * 12/2002 Li .............................. 382/164
2003/0122956 A1 * 7/2003 Sugimoto et al. ........... 348/362
2004/0095472 A1 * 5/2004 Yoshida et al. ......... 348/208.12
2007/0165960 A1 * 7/2007 Yamada ...................... 382/254

FOREIGN PATENT DOCUMENTS

EP 1800259 A1 * 6/2007
JP 03-110797 5/1991
JP 08069532 A * 3/1996

OTHER PUBLICATIONS

Mike Braun et al., "Information Fushion of Flash and Non-Flash Images", CS223b Final Project, http://brug-pyrmont.ed/georgp/vision.htm, 2002, 13 pages.*

* cited by examiner

Primary Examiner—Vu Le
Assistant Examiner—Nathan Bloom
(74) Attorney, Agent, or Firm—Cowan, Liebowitz & Latman, P.C.

(57) ABSTRACT

An image processing apparatus, which obtains a synthesized image whose exposure is corrected by synthesizing a first image and a second image, is disclosed. The image processing apparatus comprises a detection section which detects an amount of displacement of the second image with respect to the first image which is a reference image, a coordinate conversion section which performs coordinate conversion to the second image so as to conform to the first image, and a synthesis section which synthesizes the second image having been subjected to the coordinate conversion with the first image.

7 Claims, 12 Drawing Sheets

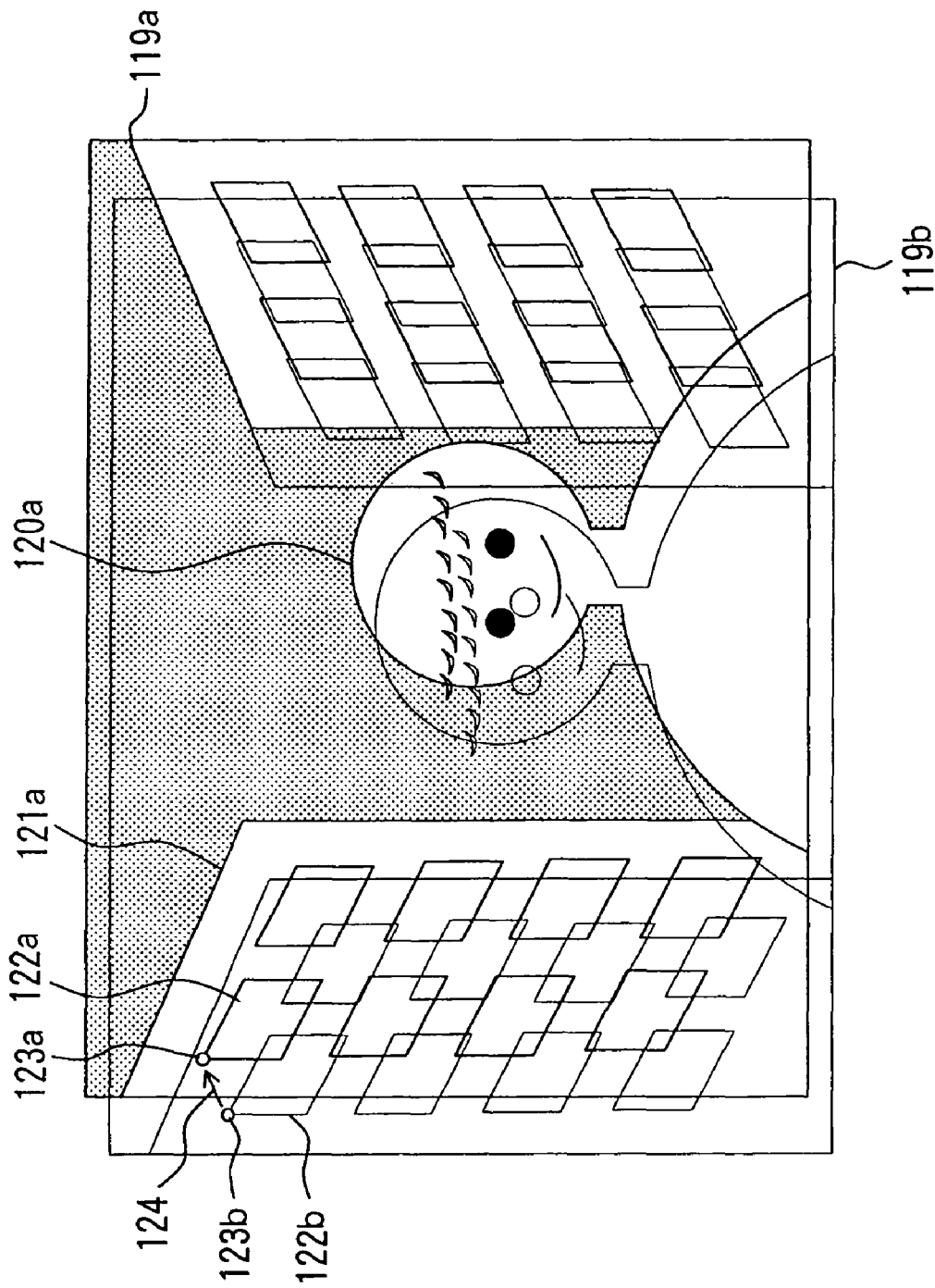

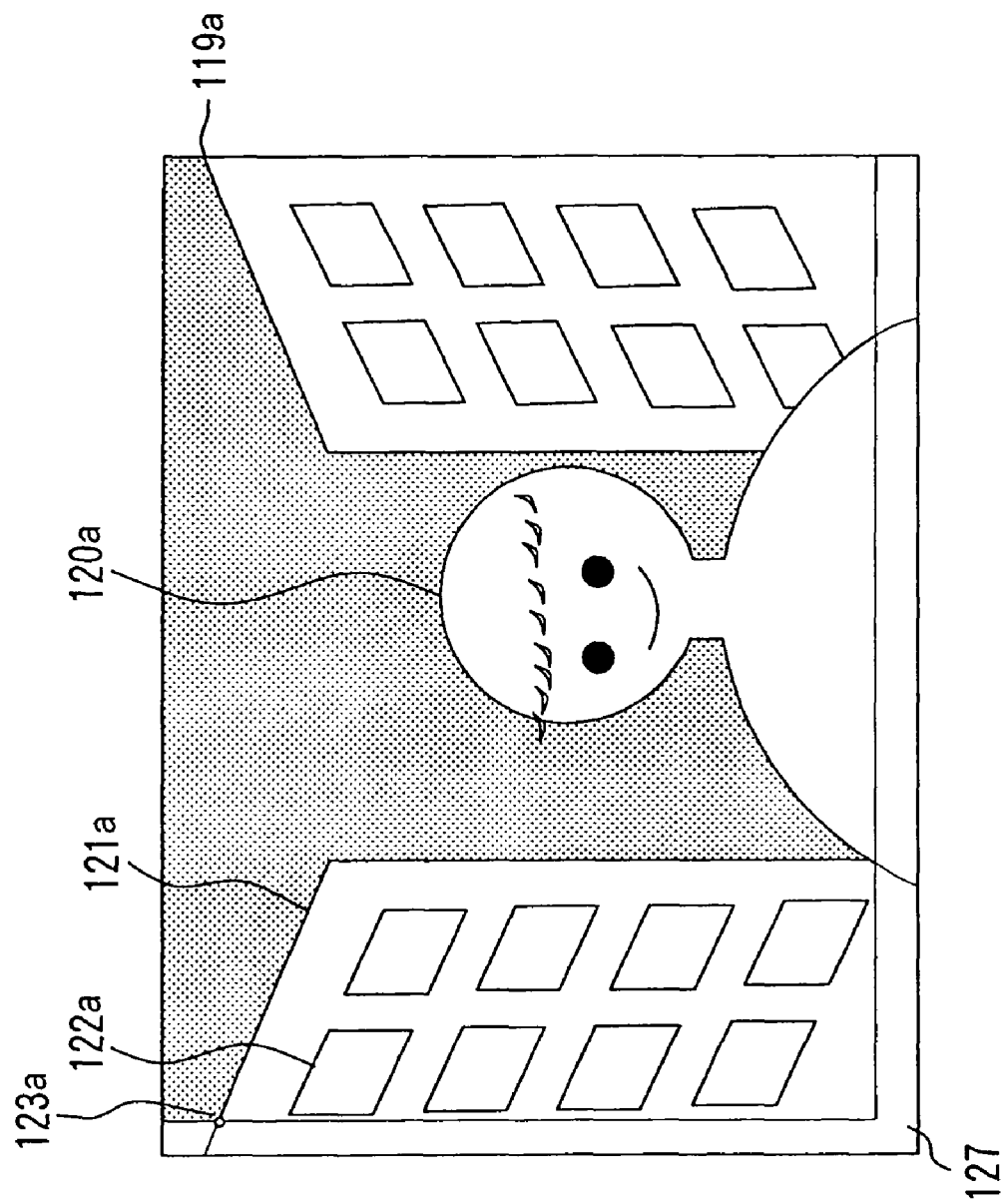

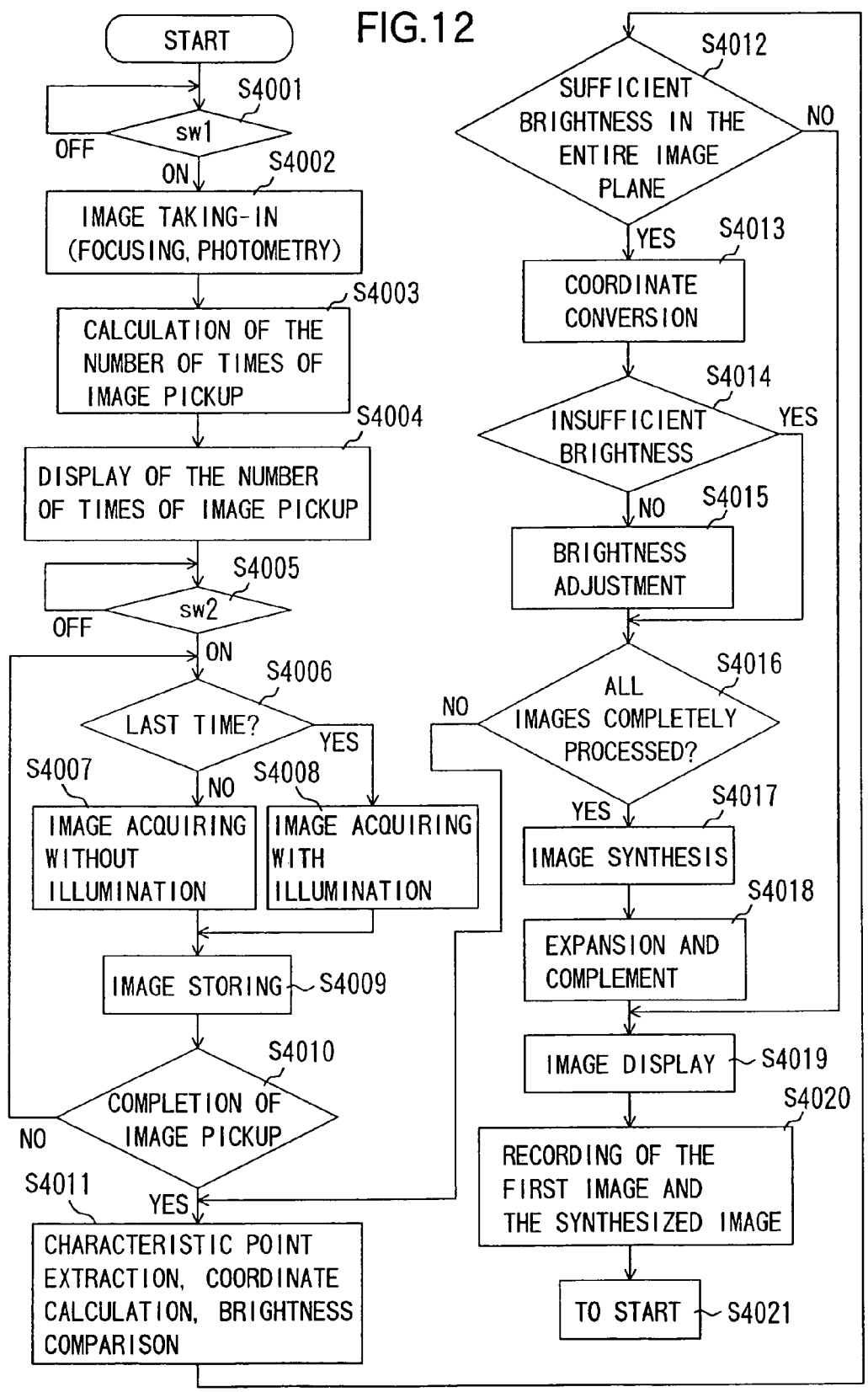

IMAGE PROCESSING APPARATUS, IMAGE TAKING APPARATUS AND PROGRAM

BACKGROUND OF THE INVENTION

1. Field of the Invention

The present invention relates to an image processing apparatus and an image taking apparatus such as a digital camera which improves image taking accuracy by correcting image blur caused by vibration and a program which is used for the apparatuses.

2. Description of Related Art

Operations important for image taking such as exposure determination and focusing, etc., of cameras that are currently used, have been completely automated, and even a person who is unskilled in camera operations is unlikely to cause an image taking failure.

Furthermore, recently, a system that represses image blur from being caused by vibration applied to the camera has also been studied, and factors that cause a photographer to fail in image taking have been reduced to almost zero.

Herein, a vibration isolation system that represses image blur is briefly described.

Camera shake when image taking appears as vibration with a frequency of, normally, 1 Hz through 10 Hz, and for enabling the camera to take a picture without image blur even when such vibration occurs at a point of exposure, it is required that camera shake due to vibration is detected and a correcting lens is displaced within an optical axis orthogonal plane according to the results of this detection (optical vibration isolation system).

Namely, in order to take a picture without image blur even when camera shake occurs, it becomes necessary that, first, camera shake is accurately detected, and second, an optical axis change due to vibration is corrected.

Camera shake can be detected by, in principle, mounting on a camera a vibration detecting unit that detects acceleration, angular acceleration, angular velocity, and angular displacement by means of a laser gyro, etc., and carries out appropriate calculation for the results of this detection. Then, by driving a correcting optical unit that makes an image taking optical axis eccentric on the basis of the detection information on camera shake outputted from the vibration detecting unit, image blur correction is carried out.

On the other hand, Japanese Patent Publication No. 3110797 discloses a method in which image taking is repeated a plurality of times in an exposure period with a length that does not cause vibration, and a plurality of images obtained through the image taking are synthesized while correcting image divergence among the images to obtain a taken image (synthesized image) of a long exposure period.

Recent digital cameras have become smaller in size than silver haloid compact cameras, and in particular, a camera that has an image pickup device of a VGA class has been downsized so that it is built-in a portable electronics device (such as a portable phone). In order to mount the abovementioned optical vibration isolation system on a camera, it is necessary that the vibration correcting optical unit is made smaller or the vibration detecting unit is made smaller.

However, in the vibration correcting optical unit, since a correcting lens must be supported and highly accurately driven, there is a limit to downsizing. In addition, most of the vibration detecting units that are currently used utilize inertia, so that if the vibration detecting units are downsized, detection sensitivity lowers and accurate vibration correction becomes impossible.

Furthermore, vibration to be applied to cameras includes angular vibration around a predetermined axis and shifting vibration that shakes a camera parallel, and although the angular vibration is correctable by the optical vibration isolation system, the shifting vibration is hardly corrected. This shifting vibration tends to become greater as the camera becomes smaller.

On the other hand, as a different vibration isolation system, as employed in a video camera for taking a moving image, a method in which a motion vector of an image plane is detected based on an output of an image pickup device and an image readout position is changed according to the detected motion vector to obtain a moving image without image blur can also be employed. This method has an advantage in that the camera can be downsized since the vibration detecting unit and the correcting lens in the abovementioned optical vibration isolation system become unnecessary.

However, this vibration isolation system used in video cameras cannot be easily applied to digital cameras. The reason for this is described below.

Motion vector extraction in a video camera is carried out for each image reading, and for example, when images of 15 frames are extracted per second, a motion vector is detected by comparing these extracted images.

However, in a case where a still image is taken by a digital camera, exposure is carried out only once for an object to be taken, so that motion vector detection through comparison of images as in a video camera is not possible. Therefore, the vibration isolation system for video cameras cannot be simply applied to digital cameras.

On the other hand, in the vibration isolation method disclosed in Japanese Patent Publication No. 3110797, since image taking is repeated a plurality of times, an image taking period becomes long. The long image taking period does not pose a problem when an image of a still object is taken. However, when an image of an object such as a person that even slightly moves is taken, shake of an object side (object vibration) is caused, and image blur caused by object vibration cannot be suppressed although image blur caused by hand vibration can be suppressed, and a taken image may deteriorate.

SUMMARY OF THE INVENTION

According to one aspect of an image processing apparatus of the present invention, the image processing apparatus which obtains a synthesized image whose exposure is corrected by synthesizing a first image and a second image which are taken successively by using an image pickup device, comprises a detection section which detects an amount of displacement of the second image with respect to the first image which is a reference image, and a coordinate conversion section which performs coordinate conversion to the second image so as to conform to the first image on the basis of the detection result of the detection section, and further comprises a synthesis section which synthesizes the second image having been subjected to the coordinate conversion with the first image, and a controller which sets an image taken by using light from an electric flash to the first image.

According to one aspect of an image taking apparatus of the present invention comprises the image processing apparatus and an image pickup device.

According to one aspect of a program of the present invention, the program which obtains a synthesized image whose exposure is corrected by synthesizing a first image and a second image which are taken sequentially by using an image pickup device, comprises a detecting step of detecting an amount of displacement of the second image with respect to the first image which is a reference image; a coordinate conversion step of performing coordinate conversion to the second image so as to conform to the first image on the basis of the detection result in the detecting step; and a synthesizing step of synthesizing the second image having been subjected to the coordinate conversion with the first image; and a setting step of setting an image taken by using light from an electric flash to the first image.

The characteristics of the image processing apparatus, the image taking apparatus and the program of the present invention will be clarified by the following detailed description of embodiments with reference to the accompanying drawings.

BRIEF DESCRIPTION OF THE DRAWINGS

FIG. 2 is a drawing for explaining coordinate conversion for two images.

FIG. 4 is an explanatory view of image synthesis.

FIG. 12 is a flowchart showing image taking operations in the camera of Embodiment 4.

DETAILED DESCRIPTION OF THE PREFERRED EMBODIMENTS

Embodiment 1

Figure 1:
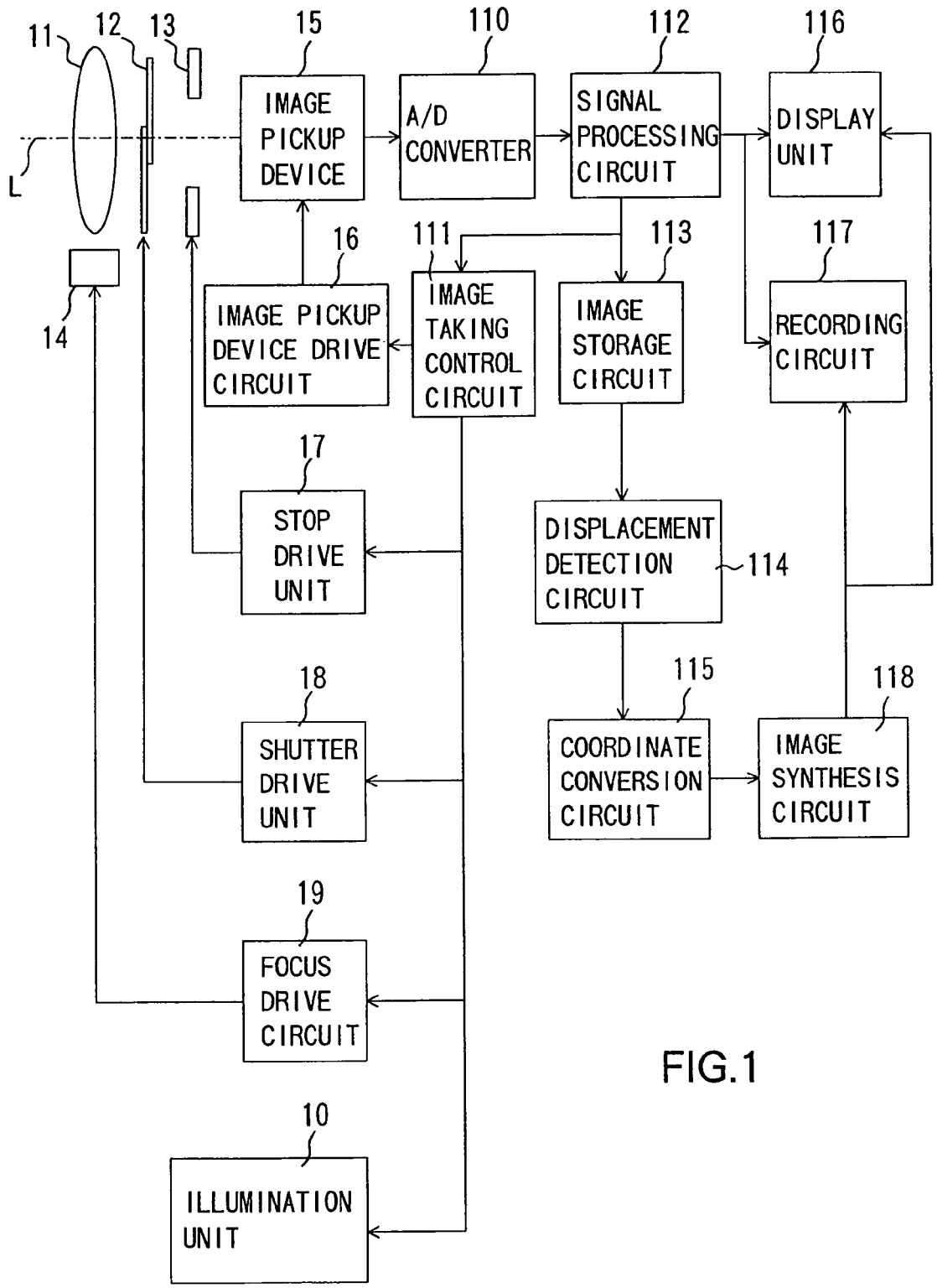
FIG. 1 is a block diagram of a camera of Embodiment 1 of the invention.

FIG. 1 is a block diagram showing a structure of a camera (image taking apparatus) of Embodiment 1 of the invention. A light flux (image taking light) that has entered from an image taking lens 11 passes through a shutter 12 and is restricted in light amount by a stop 13, and then reaches an image pickup device 15. The image pickup device 15 comprises a semiconductor image pickup device such as an MOS or a CCD. The image pickup device 15 is driven by an image pickup device drive circuit 16 which has received a control signal from an image taking control circuit 111.

The image taking lens 11 moves on an optical axis L by receiving a driving force from an AF drive motor 14, and then stops at a predetermined focus position. Thereby, the focusing operation is carried out. The AF drive motor 14 drives in response to a drive signal from a focus drive circuit 19.

The stop 13 has a plurality of stop blades, and these stop blades actuate by receiving a driving force from a stop drive unit 17 and change an aperture area (stop aperture diameter) of a light passing aperture. The shutter 12 has a plurality of shutter blades, and these shutter blades open and close the light passing aperture by receiving a driving force from a shutter drive unit 18. Thereby, the light amount of the light flux to enter the image pickup device 15 can be controlled.

Driving of the focus drive circuit 19, the stop drive unit 17, the shutter drive unit 18, and the illumination unit 10 is controlled by an image taking control circuit 111. Herein, the illumination unit 10 irradiates an object with illumination light by receiving a control signal from the image taking control circuit 111.

The image taking control circuit 111 detects an object luminance (photometry) on the basis of an output of a signal processing circuit 112 that is described later, and on the basis of the results of the photometry, the stop aperture diameter of the stop 13, the open period of the shutter 12, and use of the illumination unit 10 are determined. The image taking control circuit 111 calculates a focus position on the basis of the output of the signal processing circuit 112 while driving the focus drive circuit 19 (image taking lens 11). Namely, the camera of this embodiment carries out focusing of the image taking optical system according to a so-called contrast detection method.

Analog signals outputted from the image pickup device 15 are converted into digital signals by an A/D converter 110 and inputted into the signal processing circuit 112. The signal processing circuit 112 applies signal processing such as luminance signal and color signal formation to the inputted signals to generate color video signals.

Then, image signals subjected to the signal processing in the signal processing circuit 112 are displayed as a taken image by being outputted to a display unit 116, and outputted to and recorded in a recording circuit 117.

The operations described above are carried out when an image of an object having a brightness that does not require vibration correction is taken. On the other hand, to take an image of a dark object, an exposure period lengthens, and image blur may be caused by vibration. In this case, a photographer operates an operation switch (vibration isolation switch) that is provided on the camera, not shown, whereby the vibration isolation system is turned on and switches into the following operation.

First, when a photographer depresses halfway a release button (not shown) provided on the camera, an image taking preparation operation (including focusing and photometry, etc.) is started. The image taking control circuit 111 determines the open period (exposure period) of the shutter 12 and the stop aperture diameter of the stop 13 on the basis of photometric values obtained through photometry. Herein, generally, an object is dark in a case where a vibration isolation system is used, the stop is set to full-open and the exposure period is set to long period of exposure.

In the camera of this embodiment, this long period of exposure is divided into a plurality of short exposure periods, and the image pickup operation is continuously repeated the number of times corresponding to the number of divisions. Due to this division into short exposure periods, each image obtained through the exposure becomes underexposed, however, these images are less influenced by vibration (have less image blur). Then, the plurality of image data are synthesized into one after finishing all image pickup operations, whereby data of one exposure-corrected image can be generated.

However, when data of a plurality of images are generated through a plurality of times of image pickup operations, even if there is no influence of vibration on each image, the image composition (object image) may be slightly displaced among the images due to vibration during the plurality of times of image pickup operations. Herein, if the data of the plurality of images are synthesized as they are, the synthesized image may blur according to the composition displacement among the images.

In this embodiment, a plurality of image signals outputted from the image pickup device 15 in response to a plurality of serial image pickup operations are subjected to signal processing by the signal processing circuit 112 after being converted into digital signals by the A/D converter circuit 110 as mentioned above. Output signals from the signal processing circuit 112 are inputted into an image storage circuit 113 as well as the image taking control circuit 111.

The image storage circuit 113 stores all the data of the plurality of images obtained through the series of image pickup operations.

A displacement detection circuit 114 (detection section) acquires image data stored in the image storage circuit 113 and extracts a characteristic point (specific point) from an image region, and calculates the position coordinates of the extracted characteristic point within the image taking plane.

Herein, a case where a picture of a person standing against a building is taken through a plurality of serial image pickup operations is considered. In some cases where vibration is applied to the camera during a plurality of serial image pickup operations, as shown in the frame 119b of FIG. 2, an image whose composition is displaced from the image of the frame 119a is generated.

The displacement detection circuit 114 extracts an edge 123a of a window 122a having a high luminance from the building 121a positioned by the side of the person 120a in the image region of the frame 119a. The displacement detection circuit 114 also extracts a characteristic point 123b from the frame 119b in the same manner as in the case of the abovementioned frame 119a. Then, the displacement detection circuit 114 compares the characteristic point 123a with the characteristic point 123b and corrects the difference between these. Namely, the displacement detection circuit 114 applies coordinate conversion to the image data of the frame 119a or the frame 119b so that the characteristic point 123a and the characteristic point 123b overlap each other.

For example, the edges 123a and 123b are made correspondent to each other by means of template matching, etc., and the characteristic point 123b that corresponds to the characteristic point 123a in the frame 119b is searched for, whereby the displacement amount between the characteristic point 123a and the characteristic point 123b is calculated, and coordinate conversion is carried out on the basis of the calculated displacement amount.

In this embodiment, as shown in FIG. 2, coordinate conversion is applied to the image data of the frame 119b so that the characteristic point 123b of the frame 119b is moved in the direction of the arrow 124 of FIG. 2 so as to overlap the characteristic point 123a of the frame 119a.

Herein, an explanation is given for the reason why the peripheral region at the periphery of the central region in the region of the image acquired through image pickup operations is used as a region from which a characteristic point is extracted. In many cases of image taking, a main object is positioned around the center of an image taking plane and the main object is a person. In such a case, if the region corresponding to the main object is selected as a characteristic extraction region, a problem occurs due to movement of the main object.

During a plurality of serial image pickup operations, image blur is caused not only by vibration applied to the camera but also by movement of the main object. Herein, in the case where a characteristic point is extracted from the region corresponding to the main object, image coordinate conversion is carried out on the basis of the movement of the main object. In this case, it seems that an image without vibration on the main object can be created, however, movement of a person as a main object is generally complicated, so that vibration of the main object may not be properly corrected depending on the position where a characteristic point is selected, as described below.

For example, in a case where a characteristic point is extracted from a region corresponding to the eye of a main object (person), blinking influences and obstructs proper correction for the actual vibration of the entire object. Also, if a characteristic point is extracted from a region corresponding to the tip of a hand, the hand easily moves, so that coordinate conversion is carried out differently from the proper coordinate conversion for the actual vibration of the entire object.

As mentioned above, even when a characteristic point is extracted from a region corresponding to a person and image coordinate conversion is carried out on the basis of the extracted characteristic point, coordinate conversion is not always properly carried out for the person. Even after the images whose coordinates have not been properly corrected are synthesized, the points of the image other than the characteristic point are left displaced, so that an image with less image blur cannot be obtained.

Therefore, as in this embodiment, by extracting a characteristic point from a region corresponding to a still object such as a background, proper coordinate conversion can be applied to the entire image, so that a preferable synthesized image with less image blur can be obtained. However, in the characteristic point extraction method of this embodiment, object vibration influences come out as mentioned above.

In this embodiment, the object is irradiated with illumination light by driving the illumination unit 10 only at a predetermined number-th operation of the plurality of serial image pickup operations. Namely, as described below, influence of object vibration is suppressed by using the illumination light of the illumination unit 10.

In the description given below, an image obtained by using the illumination unit 10 is defined as a first image, and another image (or other images) obtained without use of the illumination unit 10 is defined as a second image. Herein, the following difference exists between the first and second images in addition to the abovementioned composition displacement. Namely, the brightness of an object region (illuminated region) which the illumination light has reached in the first image is different from the brightness of a region that corresponds to the abovementioned illuminated region in the second image.

In the first image, in the main object region which the illumination light has reached, sufficient exposure is obtained, however, exposure is insufficient in the region (background) which the illumination light does not reach. The reason for this is that the main object such as a person is generally positioned near the camera and illumination light reaches the main object, and the background is positioned far from the camera and the illumination light does not reach the background.

Herein, for the underexposed region (background), coordinate conversion is carried out to conform the second image to the first image and the first image and the second image whose coordinates have been converted are synthesized, whereby underexposure is compensated.

Figure 3A:
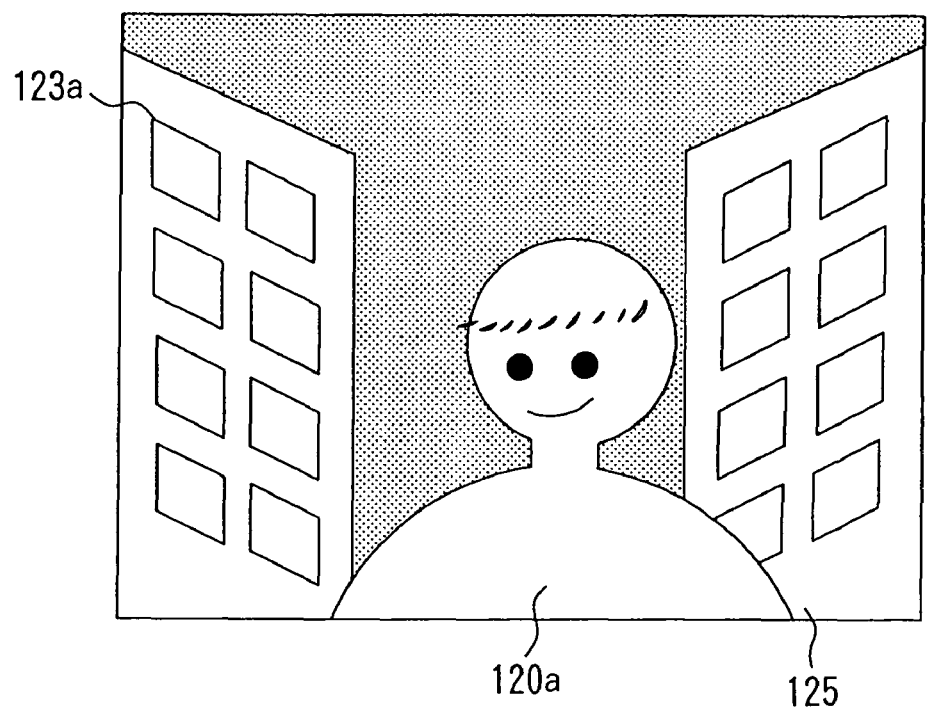
FIGS. 3A and 3B are drawings for explaining characteristic point extraction regions.
Figure 3B:
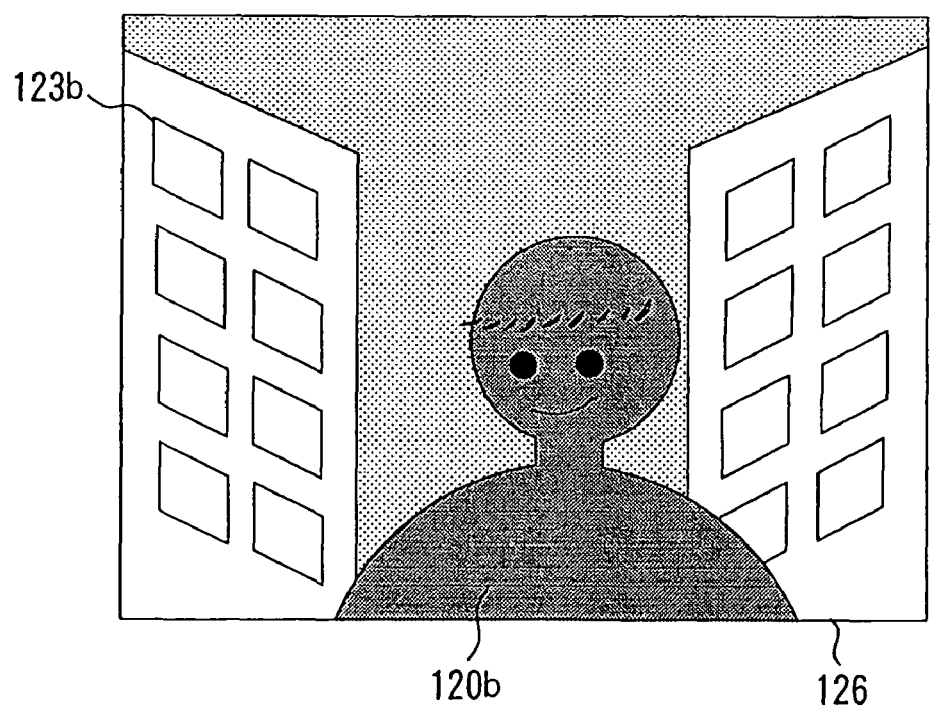

FIG. 3A and FIG. 3B are drawings for explaining a selection method for a characteristic point extraction region by the displacement detection circuit 114. FIG. 3A shows a first image obtained by using the illumination unit 10, and FIG. 3B shows a second image obtained without use of the illumination unit 10.

In the first image 125 (FIG. 3A), illumination light reaches a person 120*a*, so that almost proper exposure is obtained for the person 120*a*. On the other hand, at a background other than the person 120*a*, underexposure occurs since the illumination light does not reach.

The second image 126 (FIG. 3B) is underexposed for the person 120*b* and the background since no illumination light is provided.

Comparing the first image 125 and the second image, only the brightness at the person is different, and other regions have no difference in brightness.

The background region which have no difference in brightness (that is, the difference of the brightness is smaller than a predetermined value) becomes underexposed since illumination light does not reach. Therefore, in this embodiment, the underexposed region is regarded as a point of image synthesis (exposure correction) and set as a characteristic extraction region.

Namely, in the camera of this embodiment, on the basis of the abovementioned peripheral regions in the images obtained through the image pickup operations and a region whose brightness hardly differs between the first and second images, a characteristic point extraction region is determined.

In the images shown in FIG. 3A and FIG. 3B, the edges 123*a* and 123*b* of the window having a comparatively high luminance are extracted as characteristic points in the region which have no difference in brightness, that is, the region corresponding to the building. Then, as described in FIG. 2, the characteristic point 123*a* of the first image 125 and the characteristic point 123*b* of the second image 126 are compared with each other, and a difference between these is corrected (coordinate conversion).

The coordinate conversion circuit 115 (coordinate conversion section) shown in FIG. 1 applies coordinate conversion to the second image 126 so that the characteristic point 123*b* of the second image 126 overlaps (conforms) the characteristic point 123*a* of the first image 125. The displacement detection circuit 114 extracts the characteristic point from the remaining second images in the same manner as that of the second image 126. The coordinate conversion circuit 115 applies coordinate conversion to the remaining second images so that the characteristic points of the remaining second images overlap the characteristic point 123*a* of the first image 125.

In the abovementioned description, characteristic point changes are found by calculating the coordinates of the characteristic point of each image, however, in actuality, correlation calculation of the first image 125 and the second image 126 is carried out, and pixel changes corresponding to each other are regarded as a motion vector and defined as a characteristic point change. Furthermore, for the remaining second images, by means of correlation calculation with respect to the first image 125, characteristic point changes are also determined.

In the description given above, the case where one characteristic point is extracted, however, it is also possible that a plurality of characteristic points are extracted. In this case, an average motion vector or the minimum scalar of the plurality of characteristic points can be regarded as a characteristic point change.

Herein, use of the abovementioned minimum value of a characteristic point change is for selecting the most moveless characteristic point since characteristic points extracted in the characteristic point extraction region have the possibility of moving by themselves.

The coordinate conversion circuit 115 applies coordinate conversion to each image data (second images) according to the characteristic point changes determined by the displacement detection circuit 114. Data of the respective images subjected to coordinate conversion by the coordinate conversion circuit 115 are outputted to an image synthesis circuit 118 (synthesis section) and synthesized into one image data.

In the camera of this embodiment, the first image obtained by using the illumination unit 10 is defined as a reference (center) image for image synthesis, and the second image data are subjected to coordinate conversion so that the second images overlap the first image.

Herein, the reason why the first image 125 is set as a reference image is described.

As shown in FIG. 2, in a case where two image data whose compositions are displaced from each other are synthesized, as shown in FIG. 4, a region 127 in which the two images do not overlap each other is generated. Therefore, the image synthesis circuit 118 cuts the region 127 and applies expansion and complement processing to the region in which the two images overlap each other, whereby the synthesized image is restored to the original image size. In this expansion and complement processing, a part of the image is cut according to the orientation and degree of the composition displacement.

Herein, among the first and second images, the most accurate image information (image information on the main object) is obtained from the first image that have been obtained by using the illumination unit 10.

Therefore, in order to avoid cutting a part of the first image, it is preferable that the first image is defined as a reference image and the second images are made to overlap the first image.

In a case of a digital image, exposure correction is possible by raising the gain of even only one underexposed image data, however, if the gain is raised, noise also increases and results in an undesirable image. However, in a case where the gain of the entire image is raised by synthesizing a plurality of images as in this embodiment, noise of the images is averaged, so that an image with a high S/N ratio can be obtained, and as a result, exposure can be made proper while suppressing noise. In another consideration, it can also be said that, for example, data of a plurality of images are taken by allowing noise and setting a high sensitivity of the image pickup device 15, and data of these images are subjected to averaging process, whereby random noise included in the synthesized image is reduced.

The image data synthesized by the image synthesis circuit 118 is outputted to the display unit 116, and displayed as a still image and recorded in the recording circuit 117.

Figure 5:
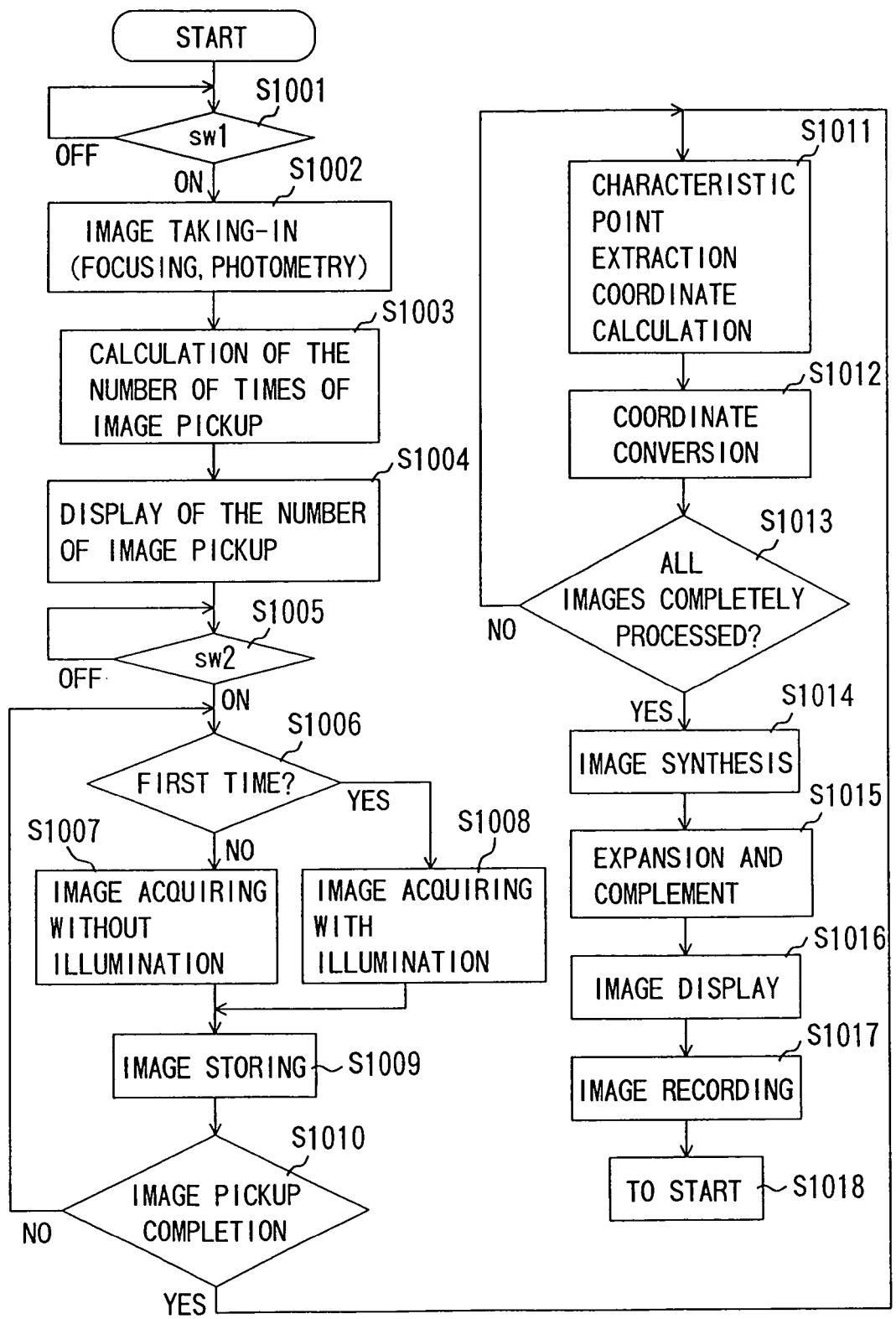
FIG. 5 is a flowchart showing image taking operations in the camera of Embodiment 1.

FIG. 5 is a flowchart showing image taking operations in the camera of this embodiment, and this flow starts when the vibration isolation switch is operated (turned on).

In Step S1001, the process waits until the sw1 is turned on by half-depression of the release button by a photographer, and when the sw1 is turned on, the process advances to Step S1002.

In Step S1002, light from an object is made to reach a light receiving surface of the image pickup device 15. Thereby, accumulated electric charge is readout from the image pickup device 15 according to the received light amount. The image taking control circuit 111 drives the AF drive motor 14 to move the image taking lens 11 in the direction of the optical axis L while detecting the contrast of the object image on the basis of the output from the signal processing circuit 112.

Then, when the contrast becomes highest, driving of the image taking lens 11 is stopped, whereby the image taking optical system is in-focus condition (that is, focusing by a hill-climbing method).

Focusing can also be carried out by a phase-difference detecting method. The image taking control circuit 111 measures the brightness of the object on the basis of the output of the image pickup device 15 (photometry).

In Step S1003, based on the brightness of the object obtained in Step S1002, the number of times of image pickup operations (reading image signals from the image pickup device 15) is calculated. Herein, for proper exposure based on the photometry results, the stop 13 is set to full-open (for example, f2.8), and the open period (exposure period) of the shutter 12 is set to ⅛ seconds.

Herein, when the focal length of the image taking optical system is 30 mm as regards 35 mm film, there is a possibility that image blur is caused by vibration in the exposure period of ⅛ seconds, so that the exposure period is set to 1/32 seconds and the image pickup operation is carried out four times. Namely, by increasing the number of times of image pickup operations according to the shortened exposure period, the total exposure period is made to be almost equal.

On the other hand, when the focal length of the image taking optical system is 300 mm, the exposure period is set to 1/320 seconds and the image pickup operation is carried out forty times so as to repress image blur.

In Step S1004, on the display unit provided within the finder of the camera or a liquid crystal display unit provided on the outer package of the camera, information on the number of times of image pickup determined in Step S1003 is displayed. A photographer can confirm the number of times of image pickup operation by looking at the indication on the display unit. It is also possible that a photographer is informed of the number of times of image pickup operation by using voice, etc.

In Step S1005, the process waits until the sw2 is turned on by full-depression of the release button. When the half-depression of the release button is released during waiting in Step S1005, that is, when the sw1 is turned off, the process returns to start.

In Step S1006, the image taking control circuit 111 judges whether or not the image pickup operation is the first time. Herein, in the case where the first image pickup operation is carried out, the process advances to Step S1008. When the image pickup operation is not the first operation, the process advances to Step S1007.

In Step S1007, by carrying out the image pickup operation without driving the illumination unit 10, second image data are generated, and the process advances to Step S1009.

In Step S1008, by carrying out the image pickup operation by driving the illumination unit 10, first image data is generated, and the process advances to Step S1009.

In Step S1009, image data obtained in Step S1007 or Step S1008 (first image data or second image data) is stored in the image storage circuit 113.

In Step S1010, it is judged whether or not the image pickup operation has been carried out the number of times determined in Step S1003, and the process waits while circulating Step S1006, Step S1007 and Step S1009 until all the number of times of image pickup operations are completed. Then, when all the number of times of image pickup operations are completed, the process advances to Step S1011.

In Step S1011, the displacement detection circuit 114 extracts a characteristic image (characteristic point) from the first image and the second images by the abovementioned method, and the coordinates of the extracted characteristic point within the image pickup region are calculated.

In Step S1012, the second image data are subjected to coordinate conversion by the coordinate conversion circuit 115. In detail, the second image data are subjected to coordinate conversion so that the characteristic points of the second images overlap the characteristic point of the first image as mentioned above. Herein, in Step S1011, in a case where the process advances to Step S1012 after the characteristic point extraction from the first image and coordinate calculation of the characteristic point, coordinate conversion is not applied to the first image data. The reason for this is that the first image data is a reference image for coordinate conversion.

In Step S1013, it is judged whether or not all the second image data have been subjected to coordinate conversion. If all second image data have not been subjected to coordinate conversion, the process circulates Steps S1011 and S1012 until application of coordinate conversion to all second image data is completed. On the other hand, when application of coordinate conversion to all second image data is completed, the process advances to Step S1014.

Namely, in the processes from Step S1011 through Step S1013 mentioned above, first, the processing of Step S1011 is applied to the first image data, and then the processing of Step S1011 and Step S1012 is applied to each of the plurality of second image data. Herein, the second image data that have been coordinate-converted are stored in the image storage circuit 113.

In Step S1014, the first image data and the plurality of second image data are synthesized by the image synthesis circuit 118. Herein, image synthesis is carried out by the averaging process of coordinate signals corresponding to the image data, and random noise included in the images is reduced through the averaging process. Then, the gain of the image with reduced noise is raised to make exposure proper.

In Step S1015, a region in the synthesized image data obtained in Step S1014 (corresponding to the region 127 of FIG. 4) in which the images do not overlap each other due to image blur is cut. Then, the synthesized image data is subjected to expansion and complement processing so that the cut synthesized image is restored to the original image size.

In Step S1016, the synthesized image data obtained in Step S1015 is outputted to a liquid crystal display unit mounted on the back surface, etc., of the camera and displayed as a still image. Thereby, a photographer can observe the synthesized image.

In Step S1017, the synthesized image data obtained in Step S1015 is recorded on a recording medium which is composed of, for example, a semiconductor memory and is attachable to and detachable from the camera. Thereby, the image taking operation is completed.

In Step S1018, the process returns to start.

In a case where the release button has been depressed halfway and the sw1 has been turned on at Step S1018, the process advances in the flow in sequence again, to Steps S1001, S1002, S1003, and S1004. In a case where the release button has been fully depressed and the sw2 has been turned on at Step S1018, the process does not return to start but waits at Step S1018.

In the description mentioned above, a characteristic point is extracted from image information, and displacements in the images (displacements of the second images from the first image) are corrected on the basis of the characteristic point changes, however, the image displacement correction method is not limited to the abovementioned method.

For example, the following method can be used. First, the first and second images are divided into a plurality of regions without condition, and differences (motion vectors) between the divided regions in the first image and the divided regions in the second image corresponding to the abovementioned divided regions in the first image are calculated. Then, among the plurality of motion vectors, based on a motion vector with a high frequency, coordinate conversion is applied to the second image, and the second image is conformed to the first image.

The abovementioned motion vector with a high frequency is not based on the object's vibration, but based on image blur caused by vibration (camera shake), so that the image blur caused by vibration can also be accurately corrected by the abovementioned method.

Embodiment 2

A camera of Embodiment 2 of the present invention is a modified example of the camera of the abovementioned Embodiment 1. Herein, the structure of the camera of this embodiment is almost the same as that described in Embodiment 1 (FIG. 1).

In Embodiment 1, a characteristic point extraction region is set to the abovementioned peripheral region in the entire region of an image obtained through an image pickup operation.

However, the characteristic point extraction region is not limited to the abovementioned peripheral region, and a region other than a focus area set within the image taking plane may be regarded as a characteristic point extraction region, or a region other than a region including a focus area which is currently focused among a plurality of focus areas may be regarded as a characteristic point extraction region.

Normally, image taking operation is carried out in a condition where a focus area overlaps a main object (person), so that in order to extract a characteristic point from a region other than a region corresponding to the main object, a region other than the focus area is set as a characteristic point extraction region.

Figure 6:
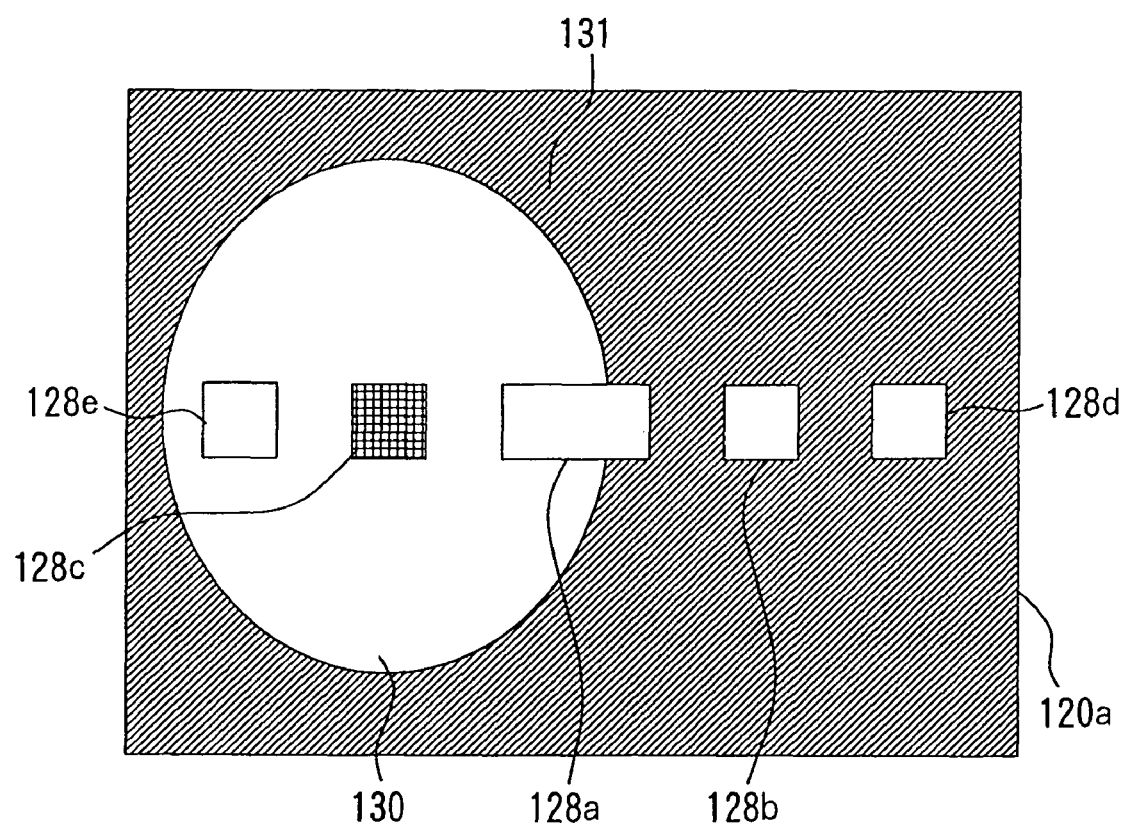
FIG. 6 is an explanatory view of a characteristic point extraction region of Embodiment 2 of the invention.

FIG. 6 shows a characteristic point extraction region within an image taking plane.

FIG. 6 shows a condition where, among focus areas 128a, 128b, 128c, 128d, and 128e set within an image taking plane (frame 120a), a main object is focused in the focus area 128c. Herein, the main object region 130 is a region having a specific extent around the focus area 128c which is focused, and is a region in which an object is highly likely positioned. Furthermore, the peripheral region 131 shaded in FIG. 6 excludes the main object region 130 in the image taking region, and is a region in which a still object is highly likely positioned. In this embodiment, the peripheral region 131 is set as a characteristic point extraction region.

In this embodiment, depending on which of the focus areas 128a, 128b, 128c, 128d, and 128e the main object is focused in, the main object region 130 and the peripheral region 131 (characteristic point extraction region) are changed.

An appropriate image is extracted as a characteristic point from the peripheral region 131, coordinate conversion is applied to the second image data on the basis of the coordinates of the extracted characteristic point, and the first image data and the coordinate-converted second image data are synthesized, whereby an image with less image blur can be obtained.

Instead of image data synthesis after completion of coordinate conversion for all image data (second image data) as shown in FIG. 5, it is also possible that after coordinate conversion is applied to one second image data, image synthesis is applied to the coordinate-converted second image data.

Figure 7:
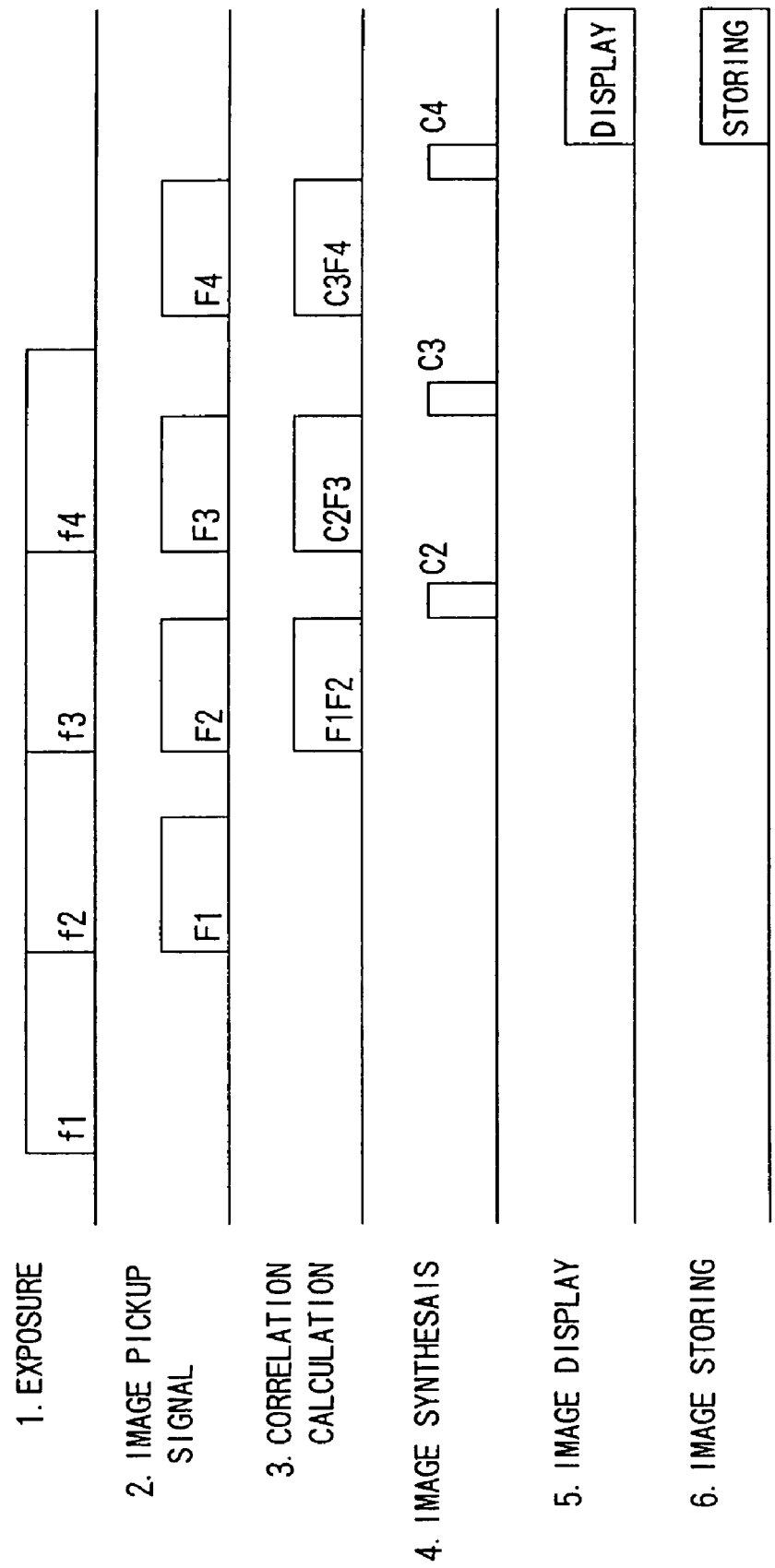
FIG. 7 is a timing chart showing image taking processing operations in the camera of Embodiment 2.

FIG. 7 shows a timing chart when the image synthesis is carried out every time coordinate conversion is applied to the second image data as mentioned above.

In response to exposure f1, a signal subjected to photoelectric conversion and charge accumulation at the image pickup device 15 is readout as an image pickup signal F1 (first image data). Then, along with reading-out of an image pickup signal F2 (second image data), correlation calculation of the image pickup signal F1 and the image pickup signal F2 is carried out. Thereby, a characteristic point change between the two images is determined, and the two image pickup signals F1 and F2 are synthesized to obtain a synthesized signal C2.

Next, along with reading-out of an image pickup signal F3 (second image data), correlation calculation of the synthesized signal C2 and the image pickup signal F3 is carried out. Thereby, a characteristic point change between the two images (the synthesized image and the readout image) is determined, and the synthesized signal C2 and the image pickup signal F3 are synthesized to obtain a synthesized signal C3.

Next, along with reading-out of an image pickup signal F4, correlation calculation of the synthesized signal C3 and the image pickup signal F4 is carried out. Thereby, a characteristic point change between the two images (the synthesized image and the readout image) is determined, and the synthesized signal C3 and the image pickup signal F4 are synthesized to obtain a synthesized signal C4.

Then, the obtained synthesized signal C4 (synthesized image data) is outputted to the liquid crystal display unit provided on the back surface, etc., of the camera and displayed as a taken image, and recorded on a recording medium.

Figure 8:
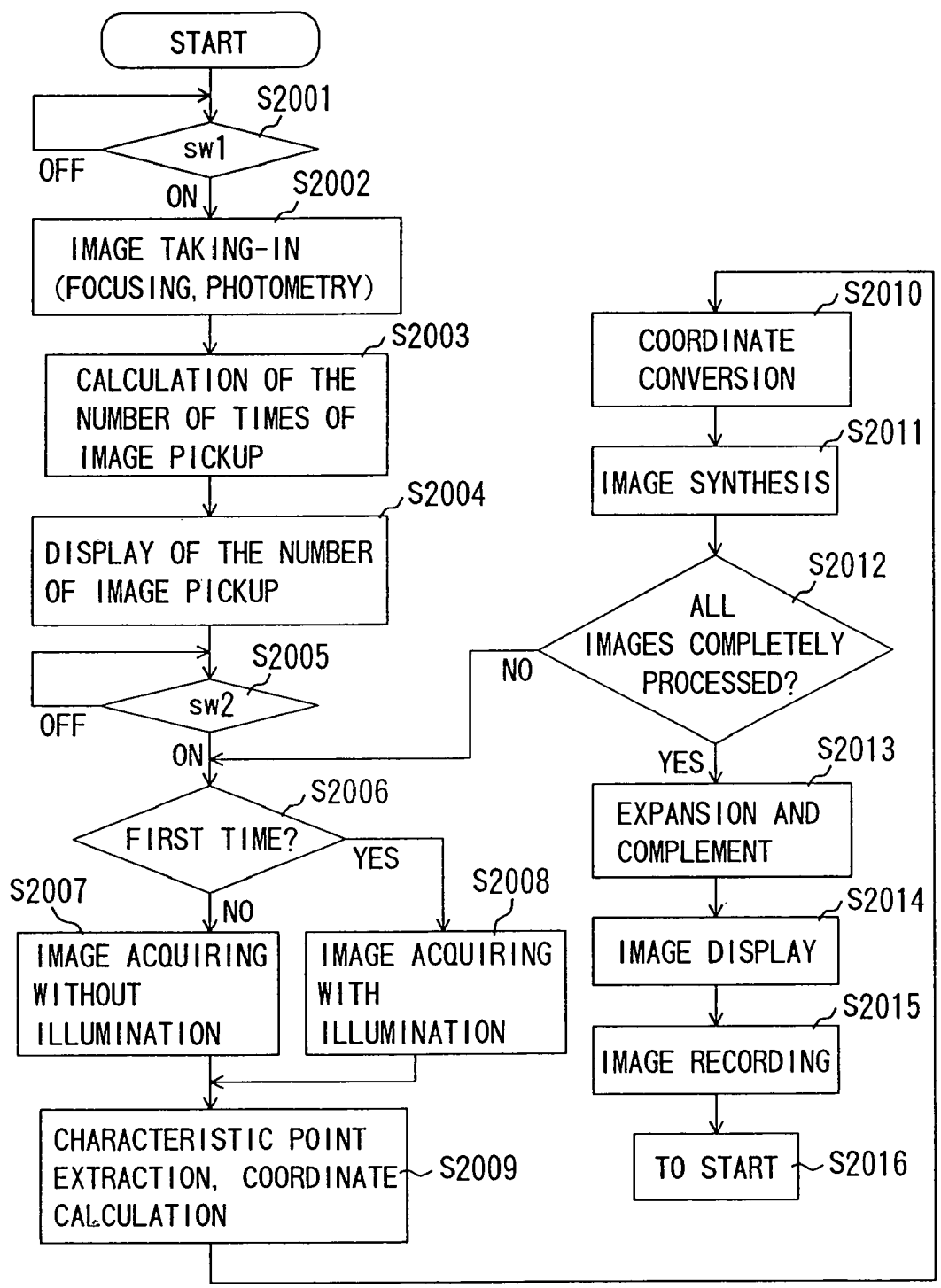
FIG. 8 is a flowchart showing image taking operations in the camera of Embodiment 2.

FIG. 8 is a flowchart of the operations described in FIG. 7. In comparison with the flowchart of FIG. 5, the image storage processing of Step S1009 is eliminated.

In FIG. 8, after coordinate conversion (Step S2010), image synthesis (Step S2011) is carried out, and it is judged whether or not the image pickup operation has completed the number of times of image pickup operation determined in Step S2003 (Step S2012). Then, in a case when the image pickup operation does not complete all the number of times, the next image pickup operation is carried out (Step S2006), and when all the number of times of image pickup operations are completed, expansion and complement processing is carried out (Step S2013).

Herein, the operations of Step S2001 through Step S2008 are the same as the operations of Step S1001 through Step S1008 of FIG. 5. The operations of Step S2013 through Step S2016 are the same as the operations of Step 1015 through Step S1018 of FIG. 5.

In this embodiment, as described in FIG. 7, each reading-out of image data from the image pickup device, the readout image data is synthesized with image data readout in advance or synthesized image data is synthesized in advance. Therefore, only one image data always exists, and it becomes unnecessary to store a plurality of image data.

Namely, since the synthesized image data is renewed every time image data is readout, it becomes unnecessary to store a plurality of image data as in Embodiment 1. Therefore, the camera of this embodiment does not have the image storage circuit 113 shown in FIG. 1.

In the flowchart shown in FIG. 8, it appears that the next image pickup operation is not carried out until processing of all images is completed in Step S2012, however, in actuality, as shown in the timing chart of FIG. 7, output of an image pickup signal (reading-out of image data), correlation calculation, and image synthesis are simultaneously carried out.

As described above, in Embodiment 1 and Embodiment 2 of the present invention, reading-out of image data in a short exposure period in which vibration hardly influences is repeated a plurality of times, and coordinate conversion and synthesis are applied to an obtained plurality of image data, whereby one taken image data (synthesized image data) is generated. Namely, by synthesizing a plurality of image data, underexposure can be complemented. In addition, by applying coordinate conversion to the plurality of image data (specifically, second image data), composition displacement in each image data caused by vibration can be corrected, whereby a taken image with less image blur can be obtained.

Thereby, although the camera is a digital still camera, it can electronically correct image blur as in the case of a video camera. Therefore, exclusive members (correcting lens, etc.) for image blur correction as provided in a silver haloid camera become unnecessary, so that the camera is downsized. Furthermore, in Embodiments 1 and 2, since displacement of the image itself is corrected, not only angular vibration but also shifting vibration can be corrected.

Furthermore, in the abovementioned Embodiments 1 and 2, in a case where coordinate conversion is applied to image data on the basis of characteristic point displacement in each image, it is considered which of regions in the image pickup plane the characteristic point is extracted from.

As shown in FIG. 6, in a case where the image pickup plane is divided into a main object region 130 in which a main object (person) is highly likely positioned and the remaining peripheral region 131, if a characteristic point is extracted from the main object region 130 and composition displacement is corrected, as mentioned above, the composition displacement cannot be accurately corrected due to vibration of the person himself/herself.

Therefore, in Embodiment 2, a characteristic point is extracted from the peripheral region 131, and based on the extracted characteristic point, composition displacement of each image is corrected (coordinate-converted). Then, the images whose coordinates have been converted are synthesized. Thereby, the composition displacement based on a still object other than a person can be corrected, and one image without image blur (taken image whose exposure has been corrected) can be obtained.

Furthermore, in the camera of Embodiment 2, by using illumination light of the illumination unit 10, a region whose brightness is different between the first image and the second image and a region whose brightness is almost the same between the first image and the second image (that is, a region in which the difference of the brightness is smaller than a predetermined value) are created, and the region whose brightness is almost the same is set as a characteristic point extraction region. Namely, in the camera of this embodiment, on the basis of the abovementioned peripheral region 131 and the region with a brightness difference, a characteristic extraction region is determined.

Thereby, a characteristic point can be accurately extracted from a region corresponding to a still object. In addition, by synthesizing the images upon applying coordinate conversion to the second image data on the basis of the extracted characteristic point, an image (synthesized image) with less image blur can be obtained.

Embodiment 3

Figure 9:
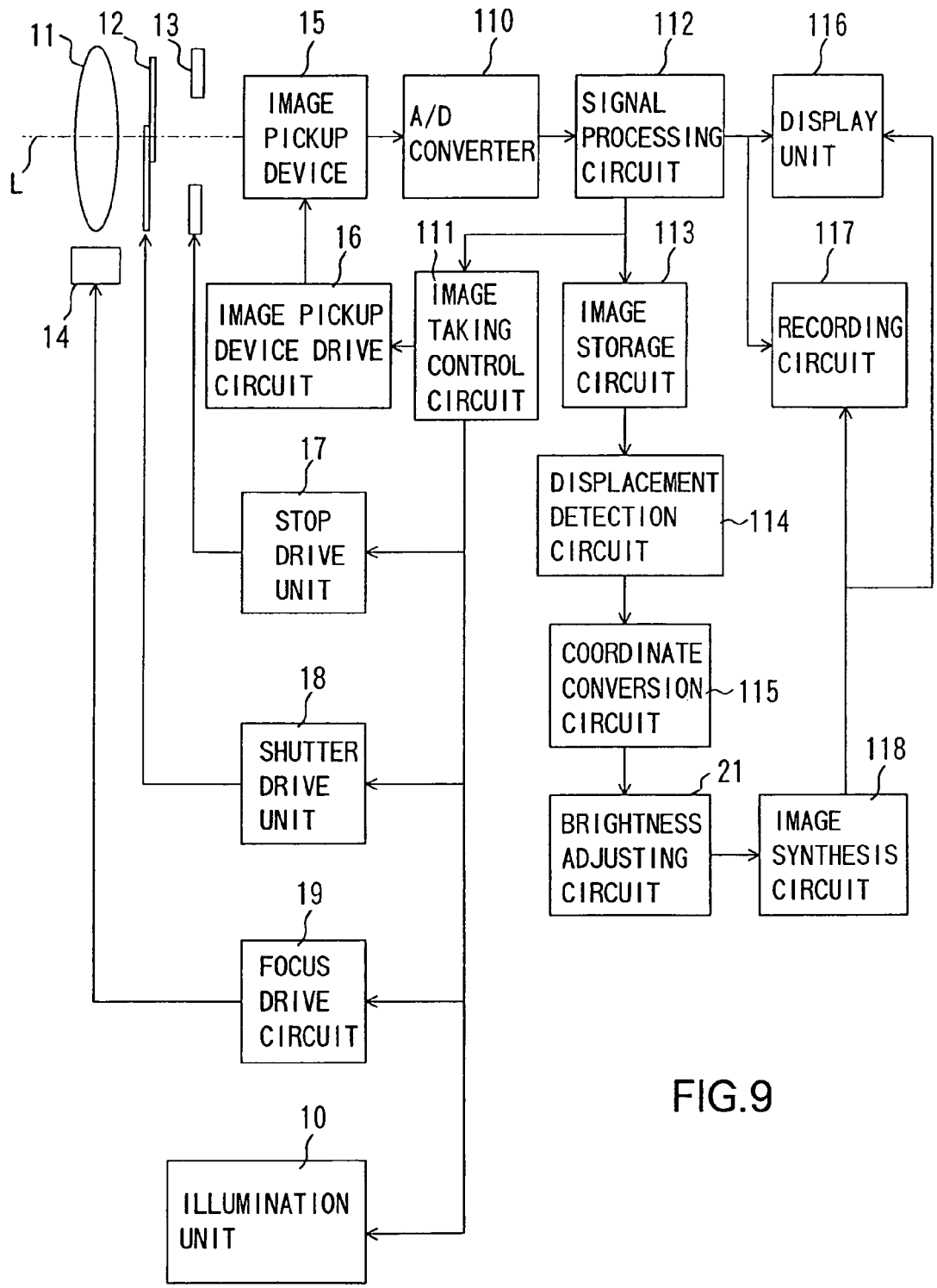
FIG. 9 is a block diagram of a camera of Embodiment 3 of the invention.

FIG. 9 is a block diagram of Embodiment 3 of the present invention. A point of difference of the camera of this embodiment from the camera of Embodiment 1 is that a brightness adjusting circuit (adjusting section) 21 is provided. For the same members as described in Embodiment 1, the same reference numerals are used.

Herein, the role of the brightness adjusting circuit 21 is described. The brightness adjusting circuit 21 darkens, in the second image whose coordinates have been converted by the coordinate conversion circuit 115, an image in a region (brightness adjusting region serving as a first region) which corresponds to a region (illuminated region) of the first image is sufficiently irradiated with illumination light of the illumination unit 10. In detail, the gain of a luminance signal in the brightness adjusting region is lowered, or the brightness adjusting region is blackened (condition without image information).

In the region (illuminated region) which is sufficiently irradiated with illumination light of the illumination unit 10 in the first image, proper exposure has already been obtained by only the first image. Then, if the first image data and the second image data are synthesized in all the regions, exposure becomes excessive in the illuminated region. Or, a background with a high luminance may overlap a person irradiated with illumination light.

Therefore, by darkening the regions of the second images that correspond to the illuminated region, only the first image data is used in the illuminated region in this embodiment.

Herein, the reason why a background with a high luminance is avoided from overlapping a person is described in detail.

In the first image, since the person is irradiated with illumination light of the illumination unit 10, proper exposure is obtained for the person. In the second images, the person is not irradiated with illumination light of the illumination unit 10, so that the object becomes dark. In some cases of the dark object, the person conceals a background with a high luminance.

In such a case, due to composition displacement caused by vibration, the background with a high luminance may be displaced from the person and seen from the edge of the person. Then, if the background (image) with a high luminance appearing from the edge of the person is superposed on the first image, the background with a high luminance that is concealed by the person and cannot be seen in the first image overlaps the person in the first image and appears (for example, from the outline of the person), and this greatly deteriorates the accuracy of the image of the person as the main object.

In this embodiment, in order to avoid the abovementioned problem, the brightness in the regions of the second image corresponding to the illuminated region are lowered by the brightness adjusting circuit 21.

By comparing the first image with the second image, a region whose brightness is different between the first image and the second image (a region sufficiently irradiated with illumination light in the first image) is set As a region to be adjusted in brightness. The brightness adjusting circuit 21 adjusts the brightness in a region (brightness adjusting region) of the second image corresponding to the illuminated region of the first image.

Herein, the brightness adjusting region (region corresponding to the illuminated region of the first image) is determined on the basis of the second image data whose coordinates have been converted by the coordinate conversion circuit 115.

In some cases, the second images before being subjected to coordinate conversion have compositions displaced from the first image due to vibration, etc. Namely, when the object part on a specific coordinate in the first image and the object part at the same coordinates on the specific coordinate in the second image before being subjected to coordinate conversion are compared with each other, the parts are not the same.

Therefore, in this embodiment, the brightness of the brightness adjusting regions are adjusted in the second images whose composition displacements have been corrected by coordinate conversion.

As a method of brightness adjustment for the second images, first, the brightness adjusting regions in the second images are blackened (condition without image information). Then, the darkness of the image at the boundary between the brightness adjusting region and a region (second region) other than the brightness adjusting region is changed in stages or continuously. In detail, the luminance signal of the image data is gradually changed from the brightness adjusting region side toward the remaining region side.

The reason for this is that the boundary of the two regions (the brightness adjusting region and the remaining region) becomes unnaturally conspicuous and preferable image can not be obtained if the brightness adjustment is applied distinctly to the regions.

In the abovementioned Embodiments 1 and 2, the illumination unit 10 is made to emit light at the first time of image pickup operation of the plurality of times of image pickup operations to be successively carried out, however, in this embodiment, the illumination unit 10 is made to emit light for the last image pickup operation of the plurality of times of image pickup operations.

Hereinafter, the reason why the illumination unit 10 is made to emit light for the last image pickup operation is described.

When a person is set as a main object and the image taking operation is performed, normally, the person thinks that image taking operation is finished when emission of the illumination unit 10 is finished, and moves from the image taking position immediately after emission is finished.

As in the camera of this embodiment, when a plurality of image data are acquired through a plurality of times of image pickup operations, the total image pickup period lengthens, and if the illumination unit 10 is made to emit light at the initial stage, a person as an object may greatly move after emission.

Therefore, in this embodiment, the illumination unit 10 is made to emit light when the last image pickup operation is carried out and no image pickup operation is carried out after the emission. Thereby, until the plurality of serial image pickup operations are completed, movement of the object (person) can be suppressed.

Furthermore, in the image pickup operation for acquiring the first image data, by making the illumination unit 10 to emit light at the final stage of exposure as in the case of rear-curtain flash synch, movement of the person can be effectively suppressed. Furthermore, it is also possible that emission (pre-emission) for acquiring information on regular emission with a proper emission light amount of the illumination unit 10 can be carried out before regular emission.

The abovementioned pre-emission can be carried out immediately before the regular emission. In detail, pre-emission is carried out before the illumination unit 10 is made to emit light (regular emission) to acquire the first image data. Furthermore, in the case of rear-curtain flash synch, the pre-emission can be carried out at the final stage of exposure immediately before regular emission. Furthermore, pre-emission can be carried out before the first image pickup operation of the plurality of times of serial image pickup operations, that is, before acquiring the first one of the plurality of second image data.

Figure 10:
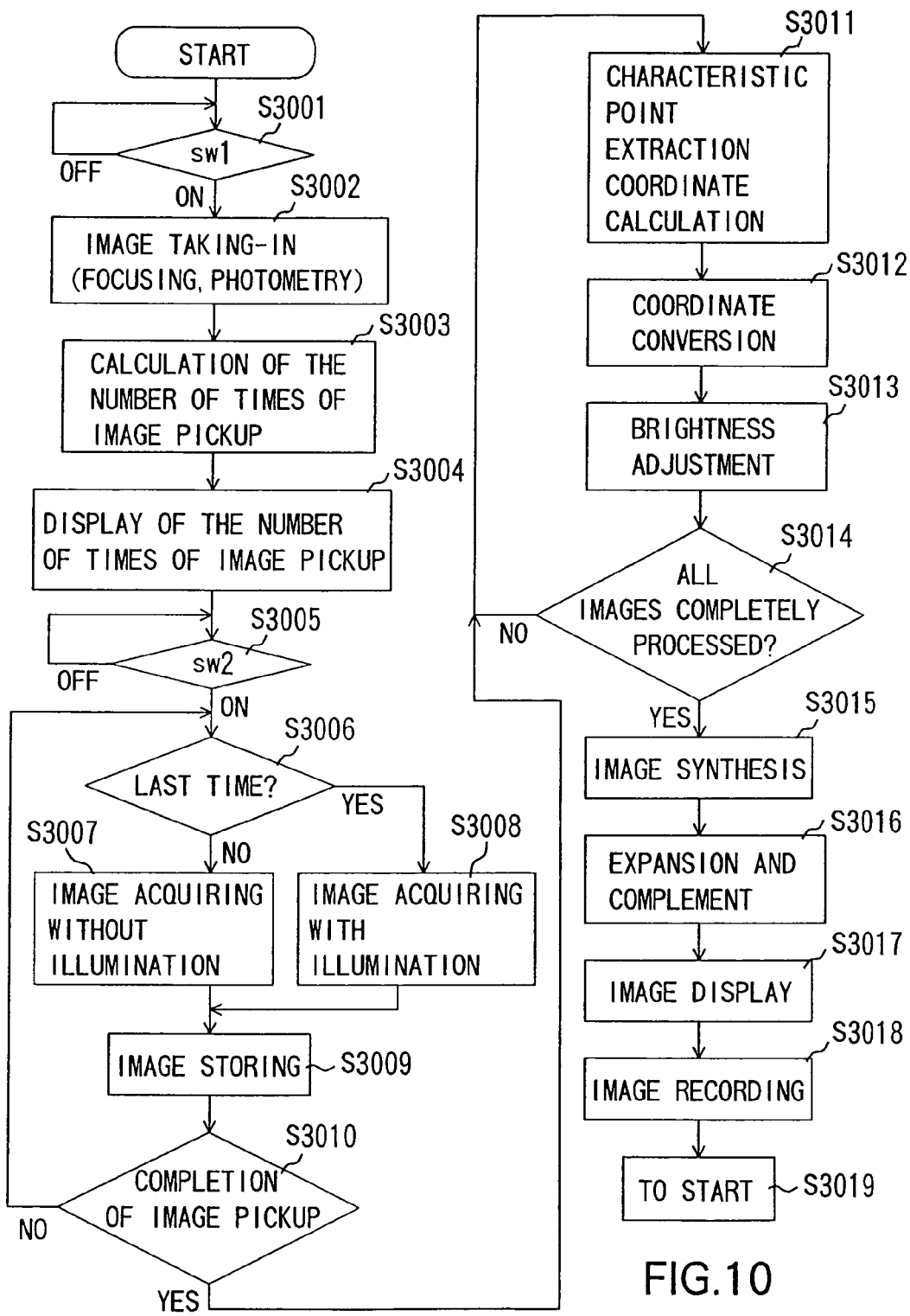
FIG. 10 is a flowchart showing image taking operations in the camera of Embodiment 3.

FIG. 10 is a flowchart showing image taking operations in the camera of this embodiment, and this flow starts when the vibration isolation switch provided on the camera is turned on.

In Step S3001, the process waits until the sw1 is turned on by half-depression of the release button by a photographer, and when the sw1 is turned on, the process advances to Step S3002.

In Step S1002, exposure to the image pickup device 15 is started. The image taking control circuit 111 moves the image taking lens 11 in the direction of the optical axis L by driving the AF drive motor 14 while detecting the contrast of an object image based on an output of the signal processing circuit 112. Then, when the contrast of the object image reaches its peak, the image taking optical system is in-focus state by stopping the movement of the image taking lens 11. The image taking control circuit 111 calculates the brightness of the object on the basis of the output of the image pickup device 15 (photometry).

In Step S3003, the number of times of image pickup is determined on the basis of the brightness of the object obtained in Step S3002. Herein, for proper exposure on the basis of the results of the photometry in Step S3002, the stop 13 must be set to full-open (for example, f2.8) and the open period (exposure period) of the shutter 12 must be set to 1/8 seconds.

Herein, when the focal length of the image taking optical system is 30 mm as regards 35 mm film, image taking with an exposure period set to 1/8 seconds may result in image blur due to vibration. Therefore, by setting the exposure period to be shorter than 1/8 seconds, image blur is repressed from appearing on an image obtained through exposure, and by carrying out exposure a plurality of times, the total exposure period is made almost equal to the abovementioned 1/8 seconds. In detail, the exposure period is set to 1/32 seconds and the image pickup operation is repeated four times.

On the other hand, when the focal length of the image taking optical system is 300 mm, the exposure period is set to 1/320 seconds and the image pickup operation is repeated forty times so as to repress image blur.

In Step S3004, information on the number of times of image pickup operation obtained in Step S3003 is displayed on a display unit provided within the finder of the camera or a liquid crystal display unit provided on the outer package of the camera. Thereby, a photographer confirms the number of times of image pickup operation. The photographer may be informed of the number of times of image pickup operation by using voice, etc.

In Step S3005, the process waits until the sw2 is turned on by full-depression of the release button. In Step S3005, when the half-depression of the release button is released and the sw1 is turned off, the process returns to start.

In Step S3006, the image taking control circuit 111 judges whether or not the current image pickup operation is the last image pickup operation. Herein, in the case of the last image pickup operation, the process advances to Step S3008. When it is not the last image pickup operation, the process advances to Step S3007.

In Step S3007, by carrying out the image pickup operation without emission of the illumination unit 10, the second image data are acquired and the process advances to Step S3009.

In Step S3008, the first image data is acquired by carrying out the image pickup operation by making the illumination unit 10 to emit light, and then the process advances to Step S3009.

In Step S3009, image data acquired through the image pickup operation of Step S3007 or Step S3008 is stored in the image storage circuit 113.

In Step S3010, it is judged whether or not the image pickup operation has been carried out the number of times determined in Step S3003. Herein, when all the image pickup operations have not been completed, the process waits while circulating Step S3006 and Step S3007 (or Step S3008). When all the image pickup operations are completed, the process advances to Step S3011.

In Step S3011, in the displacement detection circuit 114, a characteristic image (characteristic point) is extracted from a peripheral region of the first or second image, and the coordinates of the extracted characteristic point are calculated. In detail, as mentioned above, the first image and the second images are compared, and a characteristic point is extracted from a region (illuminated region) except for a region whose brightness differs for each image. Then, the coordinates of each extracted characteristic point within the image taking plane are calculated.

In Step S3012, coordinate conversion is applied to each image data in the coordinate conversion circuit 115. Herein, coordinate conversion is not applied to the first image data and the first image data is set as a reference image for coordinate conversion.

In actuality, correlation calculation of the first image data and one second image data is carried out to determine a characteristic point change. For the remaining second image data, correlation with the first image data stored in advance is also calculated to determine characteristic point changes.

In Step S3013, first, the position (coordinates) of a region (illuminated region) on the first image whose brightness differs when comparing the first image and the second images, is calculated. Then, regions (brightness adjusting regions) at the same position in the second images subjected to coordinate conversion in Step S3012 as the illuminated region are darkened. In detail, as mentioned above, the brightness adjusting regions in the second images are blackened (condition without image information), and the boundary between the brightness adjusting regions and the remaining regions are shaded off (darkness of the images are changed in stages or continuously).

Herein, in a region of a synthesized image corresponding to the illuminated region, only the image information of the first image is used as mentioned above. Thereby, the synthesized image can be repressed from being deteriorated by using the image information of the second images in the illuminated region.

In Step 3014, it is judged whether or not the processing of Steps S3011 through S3013 has been completed for all the second image data obtained in Step S3007. Herein, until the processing of Steps S3011 through S3013 is completed for all the second image data, the process returns to Step S3011 and repeats the processing of Steps S3011 through S3013. When the abovementioned processing is completed for all the second image data, the process advances to Step S3015.

In Step S3015, image synthesis process is applied to the first and second image data in the image synthesis circuit 118. Herein, in image synthesis process, coordinate signals corresponding to the respective images (first and second image data) are subjected to averaging process, and random noise included in the images is reduced by averaging process. Then, the gain of image data with reduced noise is raised to make exposure proper.

In Step S3016, in the synthesized image synthesized in the image synthesis circuit 118, a region (the region 127 of FIG. 4) in which the images (first and second images) do not overlap due to composition displacement is cut. Then, the synthesized image data is subjected to expansion and complement processing so that the cut synthesized image is restored to the original image size.

In Step S3017, the synthesized image data (taken image data) obtained in Step S3016 is outputted to a liquid crystal display unit provided on the back surface, etc., of the camera, and is displayed as a taken image on the liquid crystal display unit.

In Step S3018, the synthesized image data obtained in Step S3016 is recorded on a recording medium.

In Step S3019, the process returns to start. When the release button is depressed halfway and the sw1 is on in Step S3019, the process advances in the flow sequentially again, to Steps S3001, S3002, S3003, and S3004. When the release button is fully depressed and the sw2 is on in Step S3019, the process does not return to start but waits in Step S3019.

In the camera of this embodiment, image information of the first image obtained by using illumination light of the illumination unit 10 is used for a main object (person), and for a background, images (first and second images) obtained through a plurality of times of image pickup operations are synthesized to correct exposure. Thereby, an image including a main object and a background both of which have been properly exposed can be obtained.

As described above, the camera of this embodiment has the following effect in addition to the effects described in Embodiments 1 and 2. That is, the brightness in the brightness adjusting regions in the second image data that have been subjected to coordinate conversion are lowered, only image information of the first image is used in the illuminated region, and the first and second image data are synthesized in the illuminated region, whereby creation of an unnatural synthesized image can be repressed. Furthermore, by shading-off the boundaries of the illuminated regions and the remaining regions, the boundaries can be repressed from becoming unnatural.

Furthermore, after image pickup operations for acquiring the second image data are finished, an image pickup operation for acquiring the first image data is carried out, whereby all the image pickup operations can be completed in time with a light emitting operation of the illumination unit 10, and this represses that the object (person) moves before completion of all image pickup operations.

Embodiment 4

Figure 11:
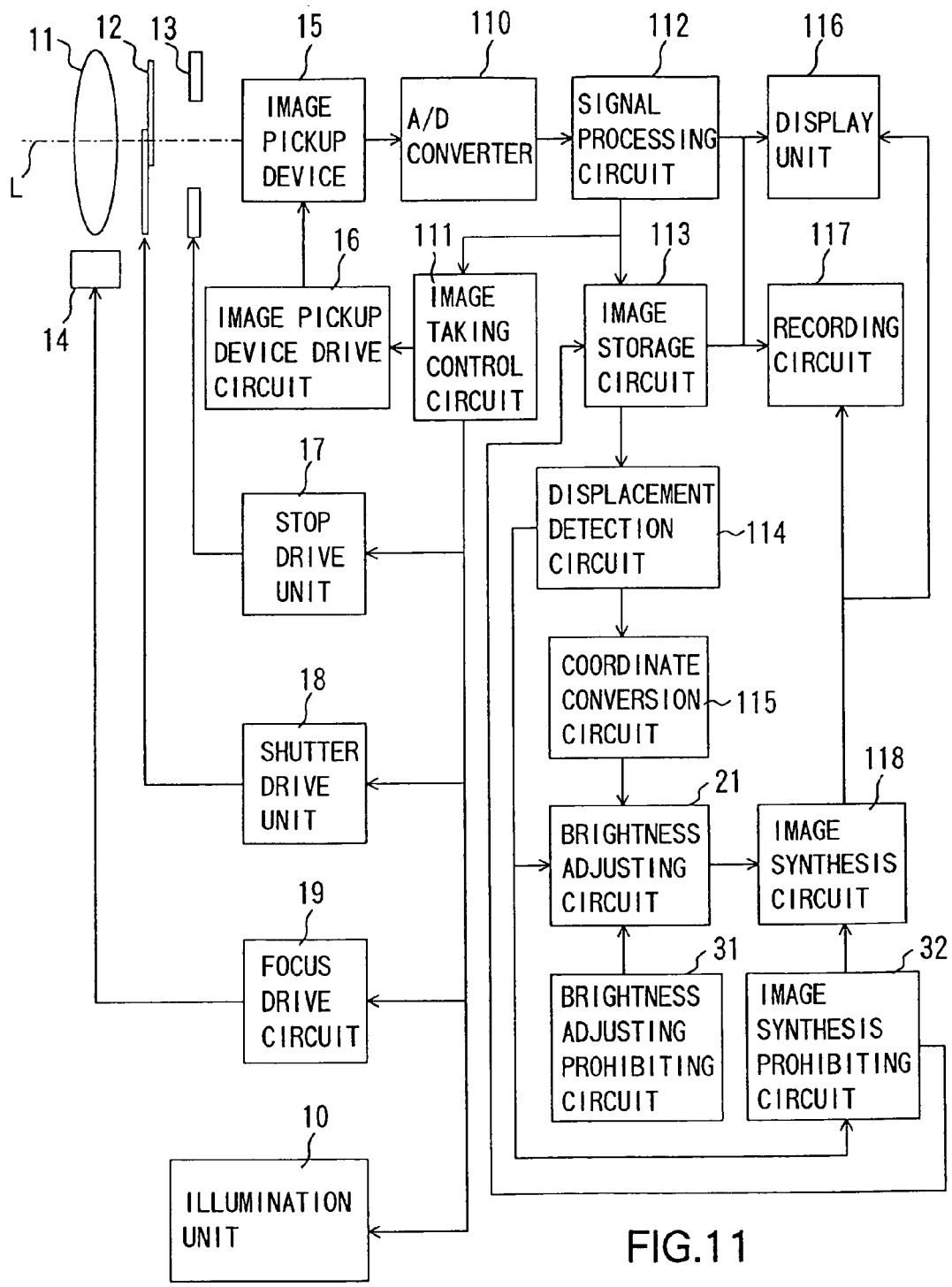
FIG. 11 is a block diagram of a camera of Embodiment 4 of the invention.

The structure of a camera of Embodiment 4 of the present invention is shown in FIG. 11. Points of difference from Embodiment 3 (FIG. 9) are that a brightness adjustment prohibiting circuit 31 (adjustment prohibiting section) and an image synthesis prohibiting circuit 32 (synthesis prohibiting section) are provided, and image data is inputted from the image storage circuit 113 into the recording circuit 117.

Herein, an operation of the brightness adjustment prohibiting circuit 31 is described. The brightness adjustment prohibiting circuit 31 operates when the first image data is acquired and an object is not sufficiently irradiated with illumination light of the illumination unit 10. For example, in some cases where a person as an object is far from the camera, illumination light of the illumination unit 10 does not reach the person.

As in the abovementioned embodiment, the displacement detection circuit 114 compares the first image and the second image, sets a region which has brightness difference between these as an illuminated region, and sets a region other than the illuminated region as a characteristic point extraction region.

However, in a case where the object is not sufficiently irradiated with illumination light of the illumination unit 10, the brightness difference between the first image and the second image is small. That is, the brightness difference between the first and second images is smaller than a predetermined value. Furthermore, when comparing the first image with the second image before being subjected to coordinate conversion, the brightness at the same coordinates may be slightly different. In this embodiment, when the region with a brightness difference is small, that is, when the ratio of the region with a brightness difference to the entire image region is smaller than a predetermined value, it is judged that irradiation of the illumination light is not sufficient.

In the abovementioned case, the brightness in a region of the second image corresponding to the region slightly irradiated with the illumination light of the illumination unit 10 being darkened, exposure in this region becomes insufficient even after carrying out image synthesis.

The brightness adjustment prohibiting circuit 31 judges that illumination by the illumination unit 10 is insufficient in many regions on the basis of the abovementioned results of the displacement detection circuit 114, and prohibits the brightness adjusting circuit 21 from adjusting the brightness of the second image. In this case, image synthesis is applied to all regions of the first image and the second image. By thus synthesizing the first and second image data in all regions, exposure of a synthesized image can be made proper.

Next, an operation of the image synthesis prohibiting circuit 32 is described.

As mentioned above, when an object is not sufficiently irradiated with illumination light of the illumination unit 10, the brightness adjustment prohibiting circuit 31 prohibits the operation of the brightness adjusting circuit 21.

On the other hand, in some cases, the illumination light of the illumination unit 10 does not illuminate a part of the image taking region, but illuminates the entire image taking region. In this case, when the first and second image data are synthesized, the synthesized image becomes overexposed.

Therefore, the image synthesis prohibiting circuit 32 prohibits image synthesis in the image synthesis circuit 118 when the illumination light of the illumination unit 10 illuminates the entire image taking region.

The displacement detection circuit 114 compares the first image and the second image, and judges a region which has brightness difference as a region (illuminated region) irradiated with illumination light of the illumination unit 10. Then, a region other than the illumination region is used as a characteristic point extraction region.

However, in a case where all objects within the image taking plane are close to the camera, for example, the image taking operation is performed with respect to a person close to the camera in his/her entirety or a case where the reflectance of a background is high, for example, a white wall exists immediately behind a person, the difference of the brightness occurs with respect to the entire image taking region. Namely, when comparing the first and second images, a region having no brightness change between the images does not exist, and the difference of the brightness occurs in all regions between the images.

In the displacement detection circuit 114, when it is judged that the difference of the brightness occurs with respect to the entire image taking region, the image synthesis prohibiting circuit 32 judges that the image obtained by synthesizing the first image data and the second image data will result in overexposure by receiving the abovementioned information from the displacement detection circuit 114.

Herein, in the case where there is the difference of the brightness with respect to the entire image taking region, the second images are blackened (condition without image information) by the processing of the brightness adjusting circuit 31, and exposure difference does not occurred even by image synthesis. However, small noise included in the second image data may deteriorate the synthesized image data due to image synthesis, so that the image synthesis processing in the image synthesis circuit 118 is prohibited in this embodiment.

Next, a reason why image data is inputted from the image storage circuit 113 into the recording circuit 117 is described. In Embodiment 1, only the image data obtained through image synthesis processing is recorded in the recording circuit 117, and the first and the second image data which have been used for the image synthesis are not recorded in the recording circuit 117 although they are temporarily stored in the image storage circuit 113.

In this embodiment, at least the first image data is recorded in the recording circuit 117 together with the synthesized image data. According to an object and its brightness, etc., a photographer may want to use an image (first image) obtained by making the illumination unit 10 to emit light or want to use a synthesized image obtained by synthesizing a plurality of image data. Therefore, by recording the first image data and the synthesized image data in the recording circuit 117, any of the images can be selected.

Herein, it is also possible that the second image data is recorded in the recording circuit 117, however, in this case, the recording capacity of the recording circuit 117 is filled up with the second image data, and this reduces the possible number of times of image taking.

Therefore, in the camera of this embodiment, in addition to the synthesized image data, the first image data is recorded in the recording circuit 117, and only one of the plurality of second image data can be recorded in the recording circuit 117 as appropriate.

FIG. 12 is a flowchart describing image taking operations of the camera of this embodiment. This flow starts when the vibration isolation switch provided on the camera is turned on.

In Step S4001, the process waits until the sw1 is turned on by half-depression of the release button by a photographer, and when the sw1 is turned on, the process advances to Step S4002.

In Step S4002, exposure to the image pickup device 15 is started. The image taking control circuit 111 moves the image taking lens 11 in the direction of the optical axis L by driving the AF drive motor 14 while detecting the contrast of an object image based on an output from the signal processing circuit 112. Then, when the contrast of the object image reaches its peak, the movement of the image taking lens 11 is stopped, whereby the image taking optical system is in-focus state. Then, the image taking control circuit 111 calculates the brightness of the object based on the output of the image pickup device 15 (photometry).

In Step S4003, on the basis of the brightness of the object obtained in Step S4002, the number of times of image pickup operation is determined. Herein, for proper exposure based on the photometry results obtained in Step S4002, the stop 13 must be set to full-open (for example, f2.8), and the open period (exposure period) of the shutter 12 must be set to ⅛ seconds.

Herein, when the focal length of the image taking optical system is 30 mm as regards 35 mm film, image taking with an exposure period set to ⅛ seconds may result in image blur due to vibration. Therefore, for image taking while suppressing image blur, the exposure period is set to 1/32 seconds and the image pickup operation is set to be carried out four times.

On the other hand, when the focal length of the image taking optical system is 300 mm, for image taking while suppressing image blur, the exposure period is set to 1/320 seconds and the image pickup operation is set to be carried out forty times.

In Step S4004, information on the number of times of image pickup operation determined in Step S4003 is displayed on a display unit provided within the finder of the camera or a liquid crystal display unit provided on the outer package of the camera. Thereby, a photographer is informed of the number of times of image pickup operation. It is also possible that voice, etc., is used to inform the photographer of the number of times of image pickup operation.

In Step S4005, the process waits until the sw2 is turned on by full-depression of the release button. When the half-depression of the release button is released and the sw1 is turned off in Step S4005, the process returns to start.

In Step S4006, the image taking control circuit 111 judges whether or not the process is at the last of the plurality of times of image pickup operation. Herein, when the process is of the last image pickup operation, the process advances to Step S4008. When the process is not of the last image pickup operation, the process advances to Step S4007.

In Step S4007, the second image data are acquired by carrying out image pickup operation without emission from the illumination unit 10, and the process advances to Step S4009.

In Step S4008, the first image data is acquired by carrying out the image pickup operation by making the illumination unit 10 to emit light, and the process advances to Step S4009.

In Step S4009, the image data acquired in Step S4007 and Step S4008 are stored in the image storage circuit 113.

In Step S4010, it is judged whether or not the image pickup operation has been carried out the number of times of image pickup operation determined in Step S4003, and when all the image pickup operations have not been completed, the process waits while circulating Step S4006 and Step S4007 (or Step S4008). When all the image pickup operations have been completed, the process advances to Step S4011.

In Step S4011, the displacement detection circuit 114 extracts a characteristic image (characteristic point) from the first and second images and calculates the coordinates of the extracted characteristic point. In detail, as mentioned above, the first image and the second image are compared, a characteristic point is extracted from a region other than a region with a brightness difference, and the coordinates of the extracted characteristic point in the image taking region are calculated.

Furthermore, the displacement detection circuit 114 compares the brightness in the first image and the brightness in the second image, and when a region whose brightness is much brighter in the first image than in the second image occupies a predetermined region or larger in the entire region of the first image, for example, when the central region of the image is sufficiently bright, and almost 80% of the regions other than the central region is bright by illumination light, the brightness in the entire image region is judged as sufficient. On the other hand, with respect to the region with a brightness difference between the first image and the second image, when the brightness in the first image is insufficient, illumination is judged as insufficient.

In Step S4012, the displacement detection circuit 114 judges whether or not the entire image region has a sufficient brightness as mentioned above. When the entire image region has a sufficient brightness, the process advances to Step S4013, and when the brightness is insufficient, the process advances to Step S4019.

In Step S4013, coordinate conversion is applied to the second image data by the coordinate conversion circuit 115. Herein, the first image data is not subjected to coordinate conversion and is defined as a reference image for coordinate conversion.

In Step S4014, it is judged whether or not the brightness in the first image is insufficient, that is, whether or not the illumination light of the illumination unit 10 is insufficient. Herein, when the brightness in the first image is insufficient, the process advances to Step S4016, and when the brightness is not insufficient, the process advances to Step S4015.

Namely, when the brightness in the region irradiated with illumination light in the first image is insufficient, processing to darken the brightness in the second image is prohibited, and the first image data and the second image data are synthesized, whereby proper exposure is obtained. In this embodiment, the brightness adjustment processing of the brightness adjusting circuit 21 is prohibited, however, according to the condition of irradiation of the illumination light of the illumination unit 10, that is, the condition of the brightness in the first image, the level of the brightness adjustment processing may be changed.

For example, when the brightness in the first image is sufficient, a region of the second image corresponding to the region having a sufficient brightness in the first image is blackened (condition without image information). Furthermore, when the object is irradiated to some extent by illumination light of the illumination unit 10 although the brightness in the first image is insufficient, a region of the second image corresponding to the region irradiated with the illumination light in the first image is not blackened, but can be darkened to some degree. Furthermore, when the irradiation of the illumination light to the object is equal to or lower than a predetermined amount, that is, when the object is not generally irradiated with the illumination light and the brightness in the first image is insufficient, it is possible that brightness adjustment processing is not applied to the second image data, that is, the second images are not blackened.

In Step S4015, the brightness adjusting circuit 21 compares the first image data and the second image data and determines a region with a brightness that differs between these (illuminated region that is irradiated with illumination light). Then, a region (brightness adjusting region) of the second image subjected to coordinate conversion in Step S4013, corresponding to the illuminated region, is darkened.

Herein, as a brightness adjusting method for the second image data, the brightness adjusting regions in the second images are blackened (condition without image information), and the boundary between the brightness adjusting regions and the remaining regions are shaded off.

Namely, data with respect to the brightness adjusting regions in the second image data are not used for image synthesis, and only data with respect to the illuminated region in the first image data are used. Thereby, deterioration of the synthesized image which occurs by using data of the brightness adjusting regions of the second image data for image synthesis can be suppressed.

In Step S4016, it is judged whether or not the processing of Steps S4011 through S4015 has been completed for all the first and second image data. Herein, until the processing is completed for all the image data, the process returns to S4011 and repeats the processing. When the processing is completed for all the image data, the process advances to Step S4017.

In Step S4017, the first and second image data are synthesized by the image synthesis circuit 118. Herein, the image synthesis is carried out by averaging of the coordinate signals of the respective image data, and random noise in the images is reduced by averaging process. Then, the gain of the image with reduced noise is raised to make exposure proper.

In Step S4018, a region (region 147 of FIG. 4) in which the images do not overlap due to composition displacement in the image synthesized by the image synthesis circuit 118 is cut. Then, the synthesized image data is subjected to expansion and complement processing so that the cut synthesized image is restored to the original image size.

In Step S4019, the synthesized image data obtained in Step S4018 is outputted to the liquid crystal display unit provided on the-back surface, etc., of the camera and displayed as a taken image on the liquid crystal display unit.

In Step S4020, the synthesized image data obtained in Step S4018 and the first image data are recorded in the recording circuit 117 and a recording medium (not shown).

In Step S4021, the process returns to start. When the release button is depressed halfway and the sw1 is on in Step S4021, the process advances in the flow sequentially again, to Steps S4001, S4002, S4003, and S4004. When the release button is fully depressed and the sw2 is on in Step S4021, the process does not return to start but waits in Step S4021.

As described above, Embodiment 4 of the present invention has the following effects in addition to the effects described above in Embodiments 1 through 3.

In the camera of Embodiment 4, the first image (with illumination light) and the second image (without illumination light) are compared, and when the difference of the brightness between these is smaller than a predetermined value, the operation of the brightness adjusting circuit 21 is prohibited by the brightness adjustment prohibiting circuit 31. Thereby, when illumination light does not reach the main object such as a person, the second image data are also used in addition to the first image data, whereby the brightness (exposure) of the main object is complemented.

On the other hand, when the illumination light is irradiated sufficiently in the entire region of the first image, the image synthesis prohibiting circuit 32 prohibits the synthesis operation of the image synthesis circuit 118, so that the synthesized image can be repressed from becoming overexposed.

Furthermore, in a camera which apparently corrects exposure of a taken image by synthesizing the first image (with illumination light) and the second images (without illumination light), by deleting the second image data after completion of the image synthesis, the capacity of the recording memory is saved and many taken image data can be recorded.

The embodiments mentioned above are examples of the present invention, and the invention is carried out by variously altering and improving the embodiments.

The present invention is applicable to a lens-integrated camera or a camera to which a lens unit is attached. A camera provided with an illumination unit 10 is described in each embodiment mentioned above, however, the present invention is also applicable to a camera to which an illumination apparatus is attached. Namely, by making the illumination apparatus to emit the illumination light through the communications between the illumination apparatus and the camera, the operations of the embodiments described above can be carried out.

Furthermore, the operations of the embodiments described above can be carried out by a program, which can be stored in a storing medium, etc.

In the Embodiments 1 to 4, the synthesized image data is generated in the camera.

Here, it is also possible that the first and second image data are sent to an image processing apparatus such as a PC (Personal Computer) from the camera and the synthesized image data is generated in the image processing apparatus. In this case, an operation for generating the synthesized image in the image processing apparatus is the same as that of the Embodiments 1 to 4.

While preferred embodiments have been described, it is to be understood that modification and variation of the present invention may be made without departing from scope of the following claims.

What is claimed is:

1. An image taking apparatus which obtains a synthesized image by synthesizing a plurality of images which are taken comprising:
    an image pickup device which outputs as the plurality of images a first image being captured by using an illumination unit and a second image being captured by not using the illumination unit, the first image including a first region that has been properly exposed with light from the illumination unit and a second region that has been underexposed with the light from the illumination unit;
    a detection section which extracts characteristic points from each of the first image and the second image and which detects an amount of displacement of the characteristic points within the second image with respect to the characteristic points within the first image which is reference image;
    a coordinate conversion section which performs coordinate conversion to the second image so as to conform the characteristic points within the first image to the characteristic points within the second image based on a result detected by said detection section;
    a synthesis section which synthesizes with the first image the second image having been subjected to the coordinate conversion;
    an adjusting section which adjusts brightness in a third region in the second image in order that proper exposure is obtained in the third region after being synthesized by said synthesis section, the third region corresponding to the first region irradiated with the light in the first image; and
    wherein said detection section detects the amount of displacement by using characteristic points within the second region in the first image and characteristic points within a region in the second image that corresponds to the second region, and
    wherein the apparatus farther comprising a synthesis prohibiting section which compares between the first image and the second image and prohibits an image synthesis operation of said synthesis section when the brightness difference at a characteristic point within the first image with respect to the second image is greater than a predetermined value.

2. The image taking apparatus according to claim 1, wherein said detection section defines as the second region a region that brightness difference at a characteristic point within the first image with respect to the second image is lower than a predetermined value by comparing between the first image and the second image.

3. The image taking apparatus according to claim 1, wherein said adjusting section darkens the brightness in the third region.

4. The image taking apparatus according to claim 1, wherein said adjusting section adjusts brightness so as to shade-off a boundary between the third region and a region other than the third region in the second image.

5. The image taking apparatus according to claim 1, further comprising an adjustment prohibiting section which prohibits an adjustment operation of the adjusting section when the brightness difference at a characteristic point in the first image with respect to the second image is smaller than a predetermined value.

6. The image taking apparatus according to claim 1, wherein the illumination unit irradiates light when a last image among the plurality of images is taken by said image pickup device.

7. The image taking apparatus according to claim 1 further comprising a recording section where the image synthesized by said synthesis section, the first image and the second image are recorded, wherein said recording section erases the second image after synthesizing in said synthesis section.

* * * * *